(12) United States Patent
Krill et al.

(10) Patent No.: US 7,561,802 B2
(45) Date of Patent: Jul. 14, 2009

(54) MOBILE COMMUNICATIONS VIA AN OPTICAL SIGNAL DURING ADVERSE ATMOSPHERIC CONDITIONS

(75) Inventors: Jerry A. Krill, Ellicott City, MD (US); Donald D. Duncan, Silver Spring, MD (US); Joe Frank, Potomac, MD (US); Craig R. Moore, Lisbon, MD (US); Joseph Cipriano, Springfield, VA (US); Raymond M. Sova, Owings Mills, MD (US)

(73) Assignee: The Johns Hopkins University, Baltimore, MD (US)

( * ) Notice: Subject to any disclaimer, the term of this patent is extended or adjusted under 35 U.S.C. 154(b) by 232 days.

(21) Appl. No.: 11/837,603

(22) Filed: Aug. 13, 2007

(65) Prior Publication Data

US 2009/0028573 A1 Jan. 29, 2009

Related U.S. Application Data

(62) Division of application No. 10/317,456, filed on Dec. 12, 2002, now abandoned.

(60) Provisional application No. 60/392,309, filed on Jun. 27, 2002, provisional application No. 60/420,553, filed on Oct. 23, 2002.

(51) Int. Cl.
*H04B 10/00* (2006.01)

(52) U.S. Cl. ...................................... 398/121

(58) Field of Classification Search .......... 398/118–131
See application file for complete search history.

(56) References Cited

U.S. PATENT DOCUMENTS

| 4,214,807 | A * | 7/1980 | Gfeller et al. ................... 359/7 |
| 5,600,466 | A | 2/1997 | Tsushima et al. |
| 5,722,042 | A * | 2/1998 | Kimura et al. ............. 455/13.1 |
| 6,535,314 | B1 * | 3/2003 | Mendenhall et al. ........ 398/121 |
| 7,021,836 | B2 | 4/2006 | Anderson et al. |
| 2002/0181059 | A1 * | 12/2002 | Christopher ................. 359/172 |
| 2003/0053770 | A1 | 3/2003 | Noddings et al. |
| 2003/0221118 | A1 | 11/2003 | Walker |
| 2005/0169635 | A1 * | 8/2005 | Tirosh et al. ................. 398/130 |

OTHER PUBLICATIONS

Co-pending, co-owned, allowed U.S. Appl. No. 10/611,487, filed Jul. 1, 2003.

\* cited by examiner

*Primary Examiner*—Quan-Zhen Wang
(74) *Attorney, Agent, or Firm*—Albert J. Fasulo, II

(57) ABSTRACT

A communications system for wireless transceiving of information, comprising at least one multiple optical beam scanning array transceiver located in a satellite for wirelessly transceiving the information; and at least two terminals at diverse locations capable of wirelessly transceiving the information between the terminals and the satellite, and an apparatus for determining atmospheric conditions for use in adjusting the multiple beam scanning array transceiver parameters.

9 Claims, 19 Drawing Sheets

MOBILE COMMUNICATIONS VIA AN OPTICAL SIGNAL DURING ADVERSE ATMOSPHERIC CONDITIONS

CROSS-REFERENCE TO RELATED APPLICATIONS

This application is a divisional of U.S. Non-Provisional patent application Ser. No. 10/317,456, filed on Dec. 12, 2002, now abandoned incorporated herein in its entirety by reference, which claims the benefit of U.S. Provisional patent applications No. 60/392,309 filed on Jun. 27, 2002 and No. 60/420,553 filed on Oct. 23, 2002 herein incorporated by reference.

BACKGROUND OF THE INVENTION

1. Field of the Invention

The present invention relates generally to a system for transmitting and receiving data in a mobile communication system and in particular, to a system for transmitting and receiving data in a mobile communication system utilizing optical satellite technology.

2. Description of the Related Art

Mobile communications are rapidly replacing fixed communications systems as today's users are becoming more accustomed to enjoying the freedom of accessing voice and data information anyplace and at anytime. The growth is occurring at such a rapid pace that the present cellular communications systems are quickly reaching their capacities, resulting in communication companies scrambling for more bandwidth and general expansion of their existing systems. Increasing bandwidth and capacity of the current systems has become first priority for many communication companies. As quickly as the bandwidth and capacity is increased, just as quickly it is utilized by the ever-increasing demand of the users. Basic cellular networks also require numerous cell-sites that require cellular antenna towers to be erected every few miles to provide adequate coverage. The total number of cell sites in the U.S. alone numbers in the hundreds of thousands. In addition, even with the great number of cell sites, coverage is still not guaranteed to all areas, as costs associated with placing cell sites in remote locations is not commercially economical.

Another drawback with cellular systems is the requirement for multiple protocols required to route calls throughout the system. Extensive conversion algorithms are required to accomplish the protocol based routings.

A major breakthrough occurred in increasing the bandwidth by utilizing fiber optic technologies in communication systems. The fiber optic networks economically interconnect higher density urban areas. Although fiber optics was also found to be quite useful in crossing oceans, repair and replacement of damaged cables is a costly and constant concern. In addition, the fiber optic networks are not readily available in remote regions of the earth due to geographic and economic constraints. For example, it is not economically viable or geographically feasible to construct a fiber optic network to the middle of the Sahara Desert or to the top of Mount Everest. Also fiber optic technology has the inherent drawback of being a fixed system, unable to provide voice and data communication services to users in moving vehicles, whether land, sea or airborne.

In an attempt to provide voice and data communications to remote and inaccessible areas of the planet, satellite technologies have been introduced. Many of the satellite based communications systems are radio frequency (RF) based systems. These RF systems receive and transmit signals to and from mobile or stationary locations. The RF satellite systems require high power to transmit signals from the satellites and user equipment (UE). Additionally, by the nature of limited RF frequencies available to the communications systems, the RF systems are an expensive option to use as the number of users per satellite is not cost effective. Also, cloud cover or even high humidity can often interfere with and even prevent useful communications.

In an attempt to expand the capacity of the satellite systems, use of optical link transmissions to and from the satellites is currently being developed. Generally being utilized in these developments are laser link transmissions. Although this technology has been theorized since the introduction of the laser in the 1960s, a viable system has yet to be developed. Many individuals and groups are experimenting with various systems that include low earth orbit (LEO), medium earth orbit (MEO), and geosynchronous orbit (GEO) satellites for optical linkage with ground and airborne stations. In addition to the very high bit rates of an optical based system, the power requirements of an optical system are greatly reduced compared to that of the RF systems, thus increasing their theoretical consumer value.

The above-mentioned optical satellite systems also require extensive pointing, acquiring and tracking systems. An optical communication satellite must first be instructed to point its optical transmitter and receiver in the direction of a fixed or mobile target station. This is usually accomplished utilizing an RF control signal that is sent to the satellite. After the optics of the satellite is aligned in a proper direction, the satellite must acquire the target station signal. As a method of performing the acquisition, a laser in the satellite could perform a search similar to that of early radar conical scan searching, wherein the satellite defocuses a laser beam and begins to focus the beam making micro-radian mechanical gimbal adjustments to search for stronger portions of the signal as it tightens the pattern. After alignment and acquisition, the satellite needs to perform a continuous tracking procedure to maintain a proper communication link during the transfer of the voice and data information. A typical laser tracking system would require optics, electronics and mechanical hardware to continually monitor and adjust to the movements associated with the satellite and target station or user equipment. After a point-to-point link is established, sustained communication can occur. The electronic and mechanical systems to perform these procedures are costly, and increase greatly the size and weight of the satellite.

These current optical satellite systems are quite limited in their total user capabilities, and the tracking and switching in these point-to-point systems greatly increase their cost and size. Even with the theorized optical systems, the cost to utilize these optical satellite systems to the average user would be astronomical. Also, to achieve total coverage of a vast area, for example the U.S., the present satellite systems would require massive amounts of satellites.

As stated above with respect to the satellite systems, although the coverage area is increased, the cost per user is currently at a premium. In addition, the present satellite networks are again constrained by their bandwidth capacities. Attempts to expand the bandwidth of the existing satellite networks are proving quite expensive and not quite feasible. Although tracking of mobile UE by satellites is feasible and currently in use, the tracking capability of each satellite is limited to only a small number of mobile locations at any one time.

A further problem with existing laser based satellite systems is a degradation of the optical signal that occurs as a result of atmospheric diffusion. As a laser is projected through the atmosphere, the signal is constantly being diffused by particles in the air. These particles include water particles, smog, and cloud cover, to name a few. Ideally, a laser-based system can only operate at an optimum level in arid and clear locations, thus limiting its usefulness in more needed locations.

There is therefore a need to provide a voice and data communication system that has nearly unlimited bandwidth capabilities and can provide voice and data communications to nearly unlimited multiple mobile users, whether the user is on land, sea or in air.

SUMMARY OF THE INVENTION

It is, therefore, an aspect of the present invention to providing a seamless global communications system.

In accordance with another aspect of the present invention, there is provided a method for providing a satellite based communication system that reduces the number of satellites required.

In accordance with another aspect of the present invention, there is provided a method for providing a satellite that increases the number of users.

In accordance with another aspect of the present invention, there is provided a method for providing a satellite that reduces the complexity of existing systems.

In accordance with another aspect of the present invention, there is provided a method for providing a satellite that operates in adverse atmospheric conditions.

The foregoing aspects of the present invention are realized by a communications system for wireless transceiving of information, comprising at least one multiple beam scanning array transceiver contained in a satellite for transceiving the information; and at least two terminals at diverse locations capable of wirelessly transceiving said information between the terminals and the satellite.

In a preferred embodiment of the present invention, a first terminal transmits a data and/or voice information signal to the multiple beam scanning array transceiver located in the at least one satellite. The multiple beam scanning array receives the signal at either a micro-mirror bank or an optical switch bank. The satellite routes the signal to a second terminal through the multiple beam scanning array, again utilizing the micro-mirror bank or the optical switch bank. The multiple beam scanning array is capable of handling pluralities of transmit and receive signals at any point in time, and capable of capacities of up to at least tera bits per second transfer rates.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail. Also, throughout the application no distinction will be made between voice and data communications, and the terms "data communication" and "data" will be used herein without intending to exclude other types of communications.

Figure 1:
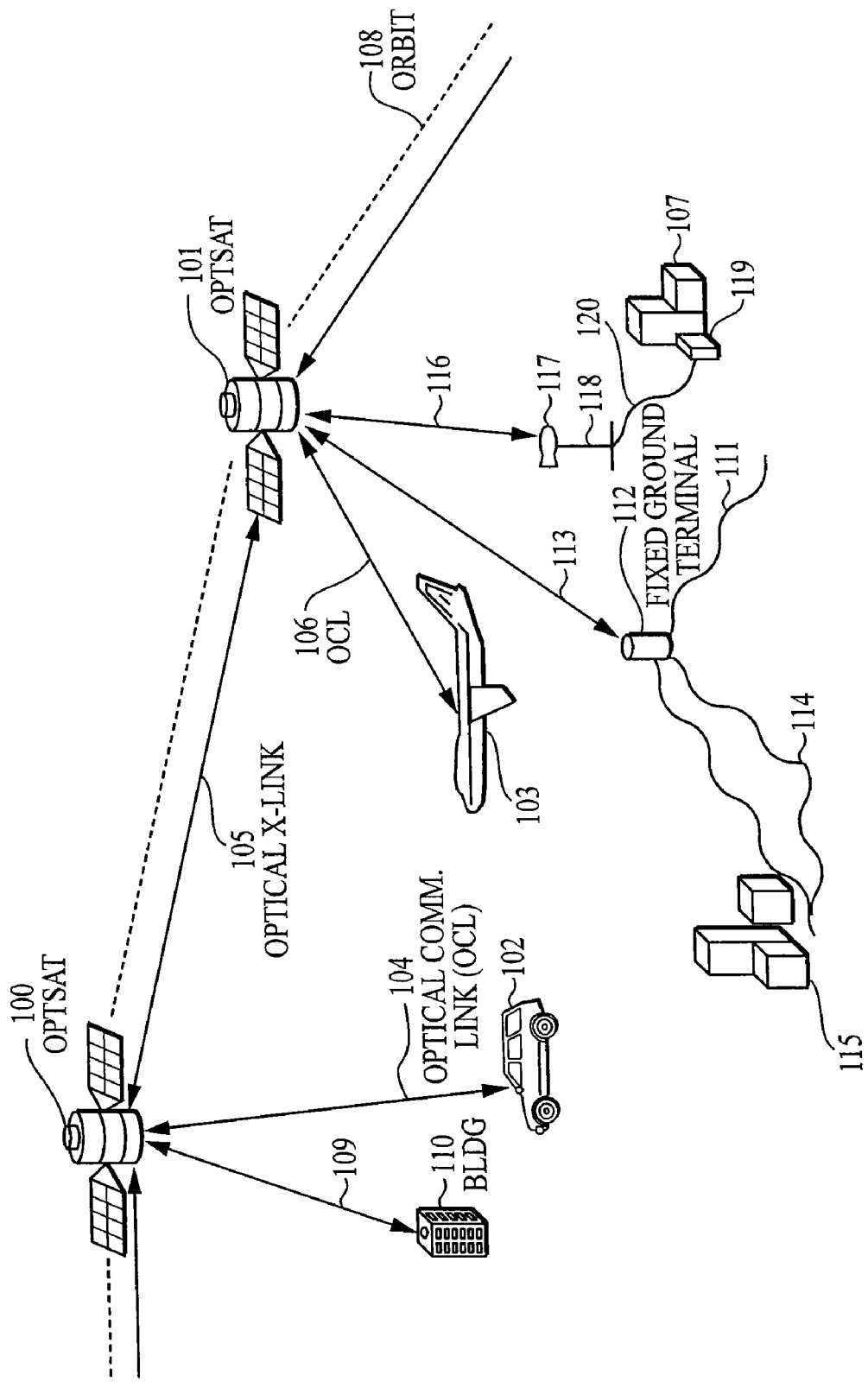
FIG. 1 is a diagram illustrating the overall satellite based communications system according to an embodiment of the present invention.

FIG. 1 is a diagram depicting the overall satellite based communication system according to an embodiment of the present invention. In the present invention, an optical tera-bps satellite (optsat) is introduced. The optsat is capable of relaying communication signals from one point to another. The optsats disclosed herein are capable of transmitting at rates of up to 2 tera bits per second per user terminal in clear weather, an increase over the prior art of a factor of about 200. Shown in FIG. 1 are a partial view of the earth 107, a first optsat 100, and a second optsat 101. Optsats 100 and 101 are shown at a geosynchronous orbit 108. Optical cross-link 105 is also shown. Optical cross-link 105 provides communications between optsat 100 and optsat 101, and can be expanded to provide cross-link communications between multiple optsats. Cross-link 105 provides data communications between optsats. This cross-link communication is utilized to expand coverage available to a single optsat. In addition, cross-link 105 provides for system synchronization and call handoff to occur between the various optsats of the overall system, as a user travels from the coverage area of one optsat to the coverage area of another optsat. Each optsat contains a multiple beam optical array (not shown) that allows the system to not only provide communication links to a great number of users, but also greatly reduces the size, weight and cost of each optsat. The multiple beam optical array, which will be described in detail below, operates on an optical array of receive and transmit lasers, using micro-electronic mechanical mirror (MEMS) devices or optical switch arrays. Also, each optsat has a coverage area dependent upon the optical array and altitude of the optsat. A LEO optsat at 1000 km altitude could cover approximately a 2000 km by 2000 km coverage area per optical array.

Although there are two optsats depicted in FIG. 1, a minimum of only one optsat is required for the system to begin to operate and provide communication links to multiple users. Also, the system is expandable to provide for further coverage with additional optsats added to the system, each optsat being interconnected via an optical cross-link. A fully expanded system can theoretically provide services to hundreds of millions of users.

Returning again to FIG. 1, shown are user locations, namely, vehicle 102, airplane 103, building 110, and cities 115 and 119. Each of the user locations can have one or more users at each location. For example, each passenger on airplane 103 could have an active communication link at any one time. Further, in an expansive version of the proposed communication system, millions of users can be serviced by the expanded system. Also each user can be communicating via data, voice or both. Optical communication links 104 and 109 are for providing data communications between vehicle 102 and building 110, respectively, and optsat 100. Optical communication link 106 is for providing a data link between airplane 103 and optsat 101. Although not shown in FIG. 1, each of the user locations requires an optsat terminal that is exposed to the optical communications links, a requirement of the line-of-sight nature of free space optical links. This line of sight or beam-to-beam requirement can be maintained through the use of tracking filters. A tracking filter, for example a Kalman filter, can be used to maintain tracking through positional changes.

Returning again to FIG. 1, shown are peripheral system components, particularly, fixed ground terminal 112 located on a mountain 111, and tether terminal 117. Each of the peripheral system components is a method of locating an optsat terminal depending on particular user needs. If a user were in a poor quality location, that is, the optical signal was negatively affected by atmospheric conditions, a mountain terminal 111 could be installed and linked to the user to provide an increase in signal transmission quality. In other poor weather locations, a tether terminal 117 could be the best alternative. Whichever location, the system can be modified to provide acceptable quality to the end users. For receiving and transmitting signals to and from a city 115, shown is a fiber optic cable 114 connected between city 115 and fixed ground terminal 112. Optical communication link 113 is for providing a data link between fixed ground terminal 112 and optsat 101. Fixed ground terminal 112 is useful for providing coverage to remote areas where the running of optical cables is not feasible. By installing a fixed ground terminal in a remote area, extreme examples include, the Sahara Desert or on Mount Everest, communications can be provided to users located within the remote area. Fiber optic cable 114 could now be quite short relative to the length of a fiber optic cable needed to extend from the nearest communications hub to, say, the top of a mountain.

Tether station 117 is shown in an airborne state connected to the earth via tether 118. A tether station can be either connected to a fixed location as shown in FIG. 1, or can be attached to a mobile location such as a military vehicle for providing a communication link at anytime and anyplace where one is required. Further, tether station 117 is connected to city 119 via fiber optic cable 120 for providing a communication path to and from city 119. Optical communication link 116 is for providing a data link between tether station 117 and optsat 101.

A brief example of the overall system function will now be described with respect to FIG. 1. Say, for example, a first person in building 110 desires to transmit data to a PDA (Personal Digital Assistant) of a second person on airplane 103. The PDA of course has wireless communications capabilities. In the normal communication systems, this call would not be possible. But in the optical satellite system according to the present invention, the data transfer would be easily attained. The first person would enter the address of the PDA to request that the system establish a communications link to the PDA. The satellite system would perform a search for the PDA and determine that the PDA is located on airplane 103. Next a first communication link would be established via communication link 109 between optsat 100 and the first person in building 110. At the same time communication link 106 will be established between the PDA on airplane 103 and optsat 101. Finally, optical cross-link 105 is established thus completing the communications link between the first person and the PDA. Although the steps of the foregoing example were performed in a specific order, the order of establishing the communications links would be defined by the particular system.

Figure 2:
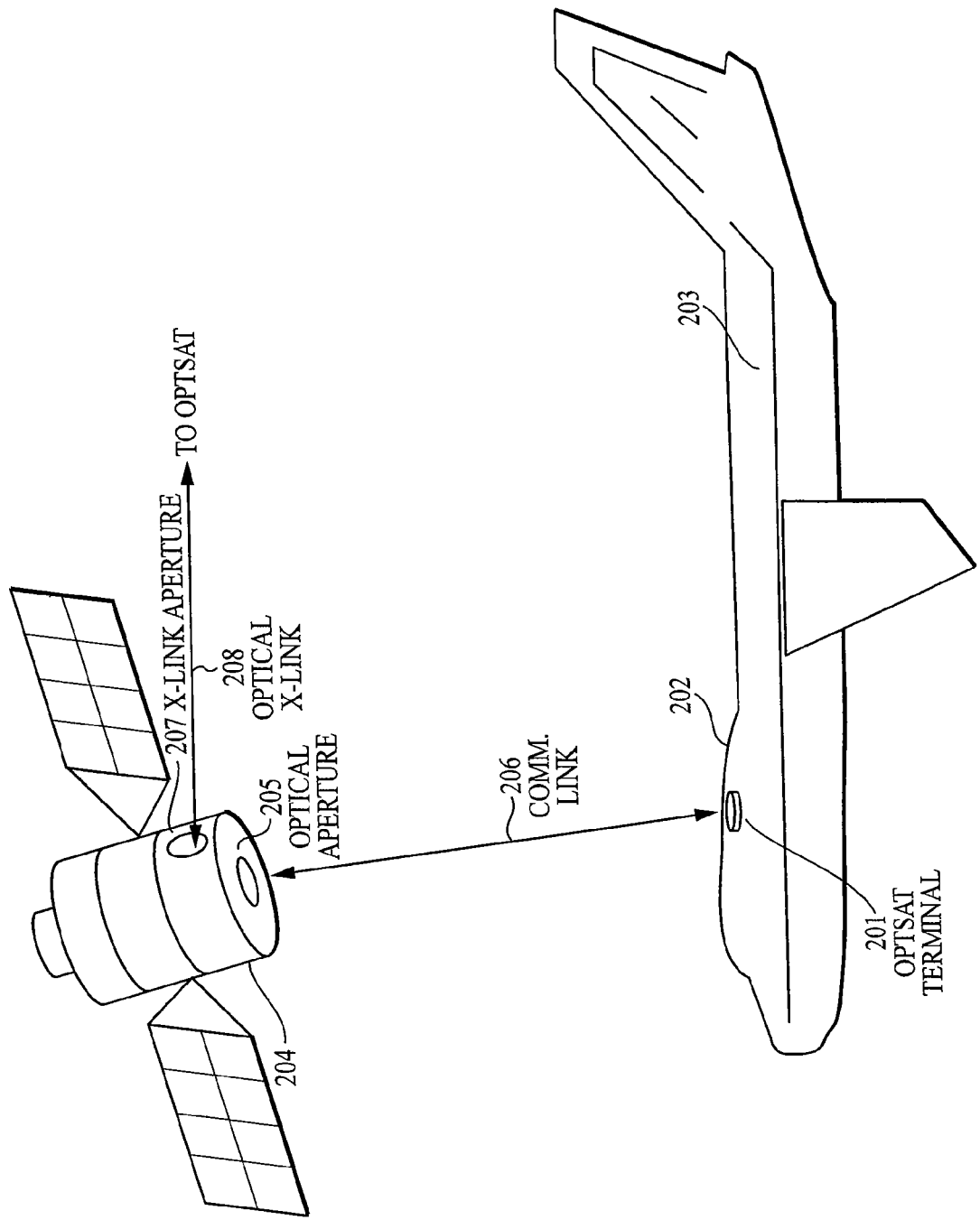
FIG. 2 is an illustration of a communication link between an optsat and an airplane according to an embodiment of the present invention.

FIG. 2 is an illustration of a communication link between an optsat and an airplane. As seen in FIG. 2, an optsat terminal 201 is externally mounted to the fuselage 202 of airplane 203. Mounted to optsat 204 is an optical aperture 205. Communication link 206 is shown providing a data link between optsat 204 and airplane 203. Whether the user is inside the airplane 203, or inside a building or vehicle, means for transceiving a laser signal to and from the inside and outside of the structure is required. The optsat terminal 201 provides this function. Data is transferred from the communications device within airplane 203 to optsat terminal 201. Optsat terminal 201 acts as a relay station to receive the internal communication and transfer it to the outside of the airplane 203. From there, the optsat terminal 201 transmits the data to optsat 204. Multi-beam optical array 205 on optsat 204 receives the data and communicates it to another user in its coverage area via the multi-beam optical array 205, or if the user is outside the coverage area of optsat 204, the control circuitry within optsat 204 would switch the data to cross-link aperture 207 to transmit to the destination in the coverage area of another optsat (not shown) via optical cross-link 208.

As discussed earlier, one of the drawbacks of purely optical based satellite communication systems is the diffusion effect that the atmosphere produces upon the optical link. As the optical link is transmitted through the atmosphere, the signal constantly collides with tiny particles suspended in the air. These particles include, but are not limited to, water molecules in the form of humidity or cloud cover, and pollution. With each collision, a portion of the optical signal is lost through its deflection produced by the collision with the particle. In more severe conditions, optical communications is impossible. As a solution to this problem, a second embodiment of the present invention includes a backup system that comprises a radio frequency (RF) transmitter and or receiver. The proposed backup system is a novel multiple beam millimeter (mm) wavelength array antenna, the details of which will be discussed below. The system can automatically or manually switch between the optical system and the RF system depending on the atmospheric conditions and system requirements. By incorporating mm wavelength technology into the system, a virtually interference free system can be constructed.

Figure 3:
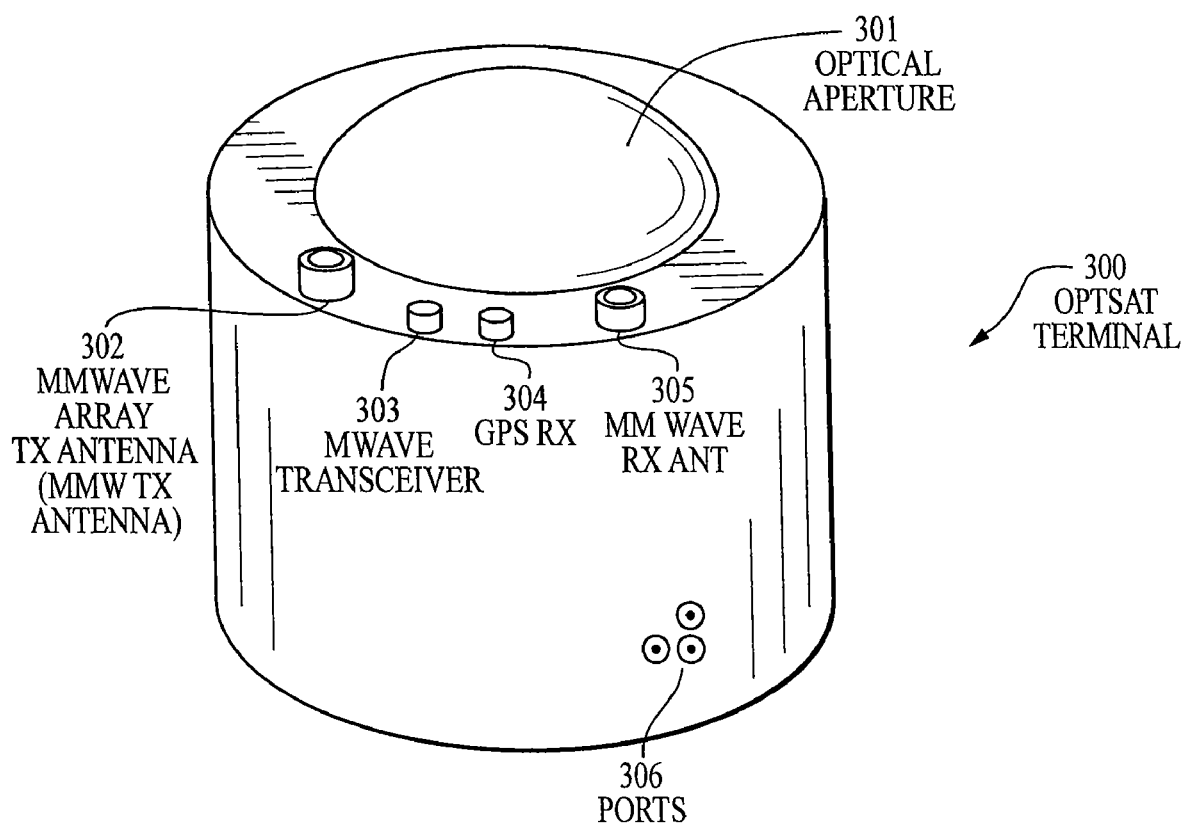
FIG. 3 is an illustration of an optsat terminal for use at a fixed or mobile location according to an embodiment of the present invention.

A preferred embodiment of the optsat terminal is shown in FIG. 3. FIG. 3 depicts optsat terminal 300 for use at a fixed or mobile location. The approximate dimensions of the optsat terminal 300 shown in FIG. 3 are preferably 15 cm in diameter by 15 to 20 cm in height. At this size, the optsat terminal 300 could be mounted almost invisibly onto any surface. The optsat terminal 300 consists of optical aperture 301 for receiving and transmitting optical signals, multiple beam millimeter (mm) wavelength array transmit antenna ("mm transmit antenna") 302 for transmitting mm backup signals during periods when the optical signals cannot be used as discussed earlier, multiple beam millimeter (mm) wavelength array receive antenna ("mm receive antenna") 305 for receiving mm backup signals during periods when the optical signals cannot be used, a GPS receiver 304 for receiving position information from a GPS satellite (not shown), a microwave transceiver 303 for transmitting and receiving standard microwave and cellular signals, also for use as a backup system and to receive and transmit signals within structures, and internal control circuitry (not shown). External ports 306 are also shown for connecting the optsat terminal 300 to external optical systems and networks (not shown), wireless user equipment (UE), and various other electronic equipment, for inputting and outputting communication signals to external user equipment (UE). The UE and the optsat terminal can be combined to create a stand alone unit. The optsat terminal depicted in FIG. 3 has an optical aperture of a size that can limit its use to low altitude satellites. For higher altitude satellites, larger apertures can be required depending on the transmission power available to the terminal.

Figure 4:
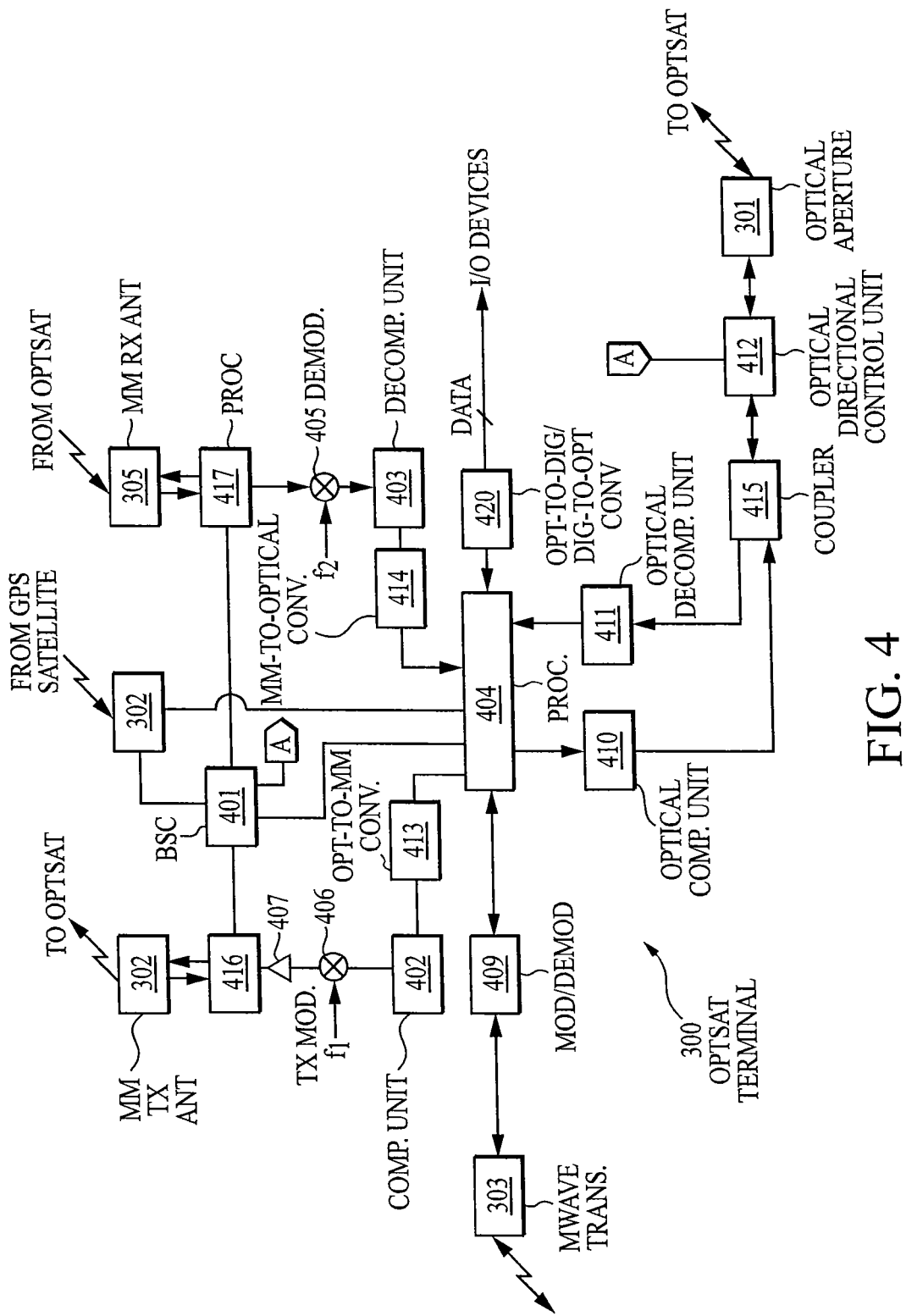
FIG. 4 is a diagram of the internal components of the optsat terminal shown in FIG. 3.

FIG. 4 is a diagram of the internal components of the optsat terminal shown in FIG. 3. Shown in FIG. 4 is processor 404 for controlling the overall operation of the optsat terminal 300. The components for processing of an optical communication signal will now be described. An optical compression unit 410 for compressing a signal for optical transmission, and an optical decompression unit 411 for decompressing a received signal are shown. A bi-directional coupler 415 for coupling the optical transmit and receive lines from optical compression unit 410 and optical decompression unit 411, respectively, is provided. Optical directional control unit 412 is also shown for controlling the directional functions of the optical beam, to be described in detail below. Optical aperture 301 is connected to the optical directional control unit 412.

Also shown in FIG. 4 are the mm and microwave backup units and the GPS receiving elements. Depicted are optical-to-mm converter 413 for converting optical signals to mm signals, compression unit 402 for providing data compression functions, a transmit modulator 406 for modulating the compressed data with modulation frequency f1 for transmission, and an amplifier 407 for amplifying the modulated data. A demodulator 405 for demodulating received data with demodulation frequency f2, a decompression unit 403 for decompressing the demodulated data, and mm-to-optical conversion unit 414 for converting the mm signal to an optical signal are also shown. Compression unit 402, decompression unit 403, optical compression unit 410 and optical decompression unit 411 are included to increase the overall capacity of the system, but are not required as uncompressed data can be processed by the system. Also the two compression units 402 and 410 can be combined, and the two decompression units 403 and 411 can also be combined, but are separately shown for a better understanding of the overall operation of the system.

Also shown is microwave modulator/demodulator 409, the operations of which are well known in the art and therefore will not be described herein in detail. Similarly, GPS receiver 304 would require demodulation. Acquisition, tracking and steering of the communication signals by the mm transmit antenna 302, mm receive antenna 305, and GPS receiver 304 are under the control of a beam steering controller 401. Processor 404 is also shown connecting to input/output (I/O) devices which can include UE, speakers, display units, microphones, and the like, the extent of which is only limited by the current I/O device technology, and can be hardwired or wireless. Even though the I/O devices are shown as components external to the optsat terminal 300, in other embodiments of the present invention the I/O devices can be included in the optsat terminal 300 to form a stand alone unit. Optical-to-digital/digital-to-optical converter 420 for converting digital signals to and from optical signals between the processor 404 and I/O devices is also shown. Note that the converter 420 can be bypassed if the I/O device can input an optical signal, or the converter 420 can be located externally from the optsat terminal 300. Also shown are mm transmission control and processing unit 416 and mm reception control and processing unit 417, which implement the control of the mm transmit and mm receive antennas 302 and 305, respectively.

The operation of the optsat terminal 300 will now be described with reference to FIGS. 3 and 4. A UE or input/output (I/O) device (not shown) is connected to optsat terminal 300 through external ports 306. A digital signal from the UE is received at converter 416 and converted to an optical signal. The optical signal is received at processor 404, and then compressed at optical compression unit 410. After the optical signal is compressed, the signal is sent to bi-directional coupler 415. The optical communication signal is output from the bi-directional coupler 415 to optical directional control unit 412, and thereafter directed through optical aperture 301 for transmission to an optsat of the system. A received signal is processed in the reverse manner, particularly, received at optical aperture 301 and sent to optical directional control unit 412, which is under control of beam steering controller 401. The received optical signal is forwarded to optical decompression unit 411 for data decompression. The decompressed signal is then converted to an optical signal in converter 416, and output to the UE or other I/O devices.

During the overall operation of the transmission and reception of the optical signals, processor 404 is continually analyzing the received signal to determine the quality thereof. If during processing, processor 404 determines that the signal quality is falling below a certain threshold, the processor will switch the system to the backup mm system. Many processes for determining the quality of a signal are known in the art, and the scope of the invention herein is not limited to any one process. After determining that the signal quality is below the preset threshold, the system switches over to the backup mm system and the optical terminal 300 begins transmitting and receiving mm wavelength signals to and from mm backup units in the optsats. A complete switchover from optical to mm backup is described but the system can determine signal quality separately for the transmit section and the receive section, and switch one section to the backup separately when required. The beam steering controller 401 continually monitors the mm signals and GPS signal and adjusts steering hardware or software to maintain the communication links of the units. The signal to be transmitted through mm transmit antenna 302 is converted to a mm signal in optical-to-mm converter 413. Compression unit 402 compresses the converted signal. The compressed signal is received from compression unit 402 at modulator 406 where it is modulated with mm modulation frequency f1. The modulated signal is amplified at amplifier 407. The amplified signal is sent to mm transmission control and processing unit 416 for millimeter array processing and transmission through mm transmit antenna 302.

A mm signal received at mm reception antenna 305 is sent to mm reception control and processing unit 417. The received signal is demodulated with demodulation signal f2 at demodulator 405. The demodulated signal is decompressed at decompression unit 403. The decompressed signal is converted to an optical signal at mm-to-optical converter 414. The quality of the decompressed optical signal is analyzed at the processor 404, while the signal is converted to a digital signal at converter 420 and output to UE through external ports 306.

During the overall operation of the system, and whether the communication signal is transmitted or received via mm or optical channels, the optsat terminal 300 is continually receiving GPS position information through GPS receiver 304. The signals are demodulated and transmitted to processor 404. Processor 404 receives the demodulated GPS position information and uses it to formulate control signals and position information for beam steering controller 401. Beam steering controller 401 receives the control signals and position information and sends control signals to directional hardware and software of the mm transmit control and processing unit 416, the mm receive control and processing unit 417, the GPS receiver 304, and optical directional control unit 412.

There are several subsystems that can be incorporated into the optsat terminals to further enhance the overall quality of the system. First, in order to establish an initial communication link between a UE and an optsat, the optsat terminal 300 must be capable of directing the transmit and receive antennas toward the optsat. Additionally, after the initial communication link is established, monitoring and determining the charging location and position of the UE is required to maintain the communication link. To this end, and in addition to the GPS tracking systems, the UE or optsat terminal is equipped with means for determining an up direction and means for determining compass direction.

To align within their parameter values, the satellite location accuracy, North/up alignment accuracy and GPS time sync of 0.1 msec, combined with the user terminal location accuracy, North/up alignment accuracy, and GPS time accuracy, will allow the terminal and satellite to precisely align their beams at any time (i.e., position orientation, and time accuracies are within their beam widths).

Figure 15:
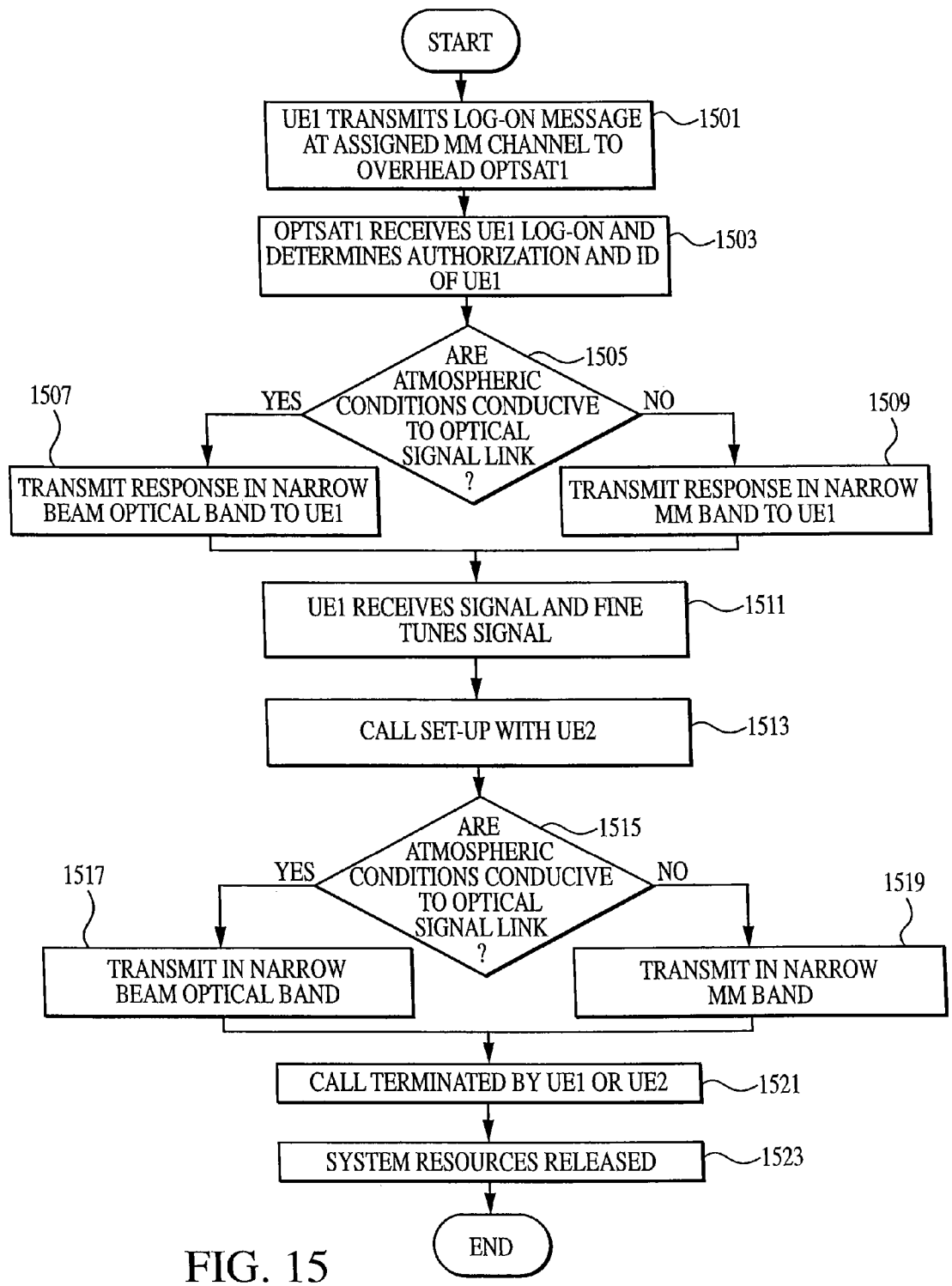
FIG. 15 is a flow diagram depicting alignment and tracking according to an embodiment of the present invention.

FIG. 15 is a flow diagram depicting alignment and tracking according to an embodiment of the present invention. In the following descriptions, "optsat1" and "optsat2" refer to optsats that directly transmit/receive signals to/from a first UE (UE1) and a second UE (UE2), respectively. It can also be said that UE1 is in the coverage area of optsat1, and UE2 is in the coverage area of optsat2. Referring to FIG. 15, in step 1501 the UE1 transmits a log-on message at an assigned mm channel to an overhead optsat1. The log-on message contains an identification code (ID) for the UE. In step 1503 optsat1 receives the UE1 log-on and determines authorization and ID of UE1. In step 1505 the system determines if atmospheric conditions are conducive to an optical signal link. If they are, in step 1507 optsat1 transmits a response in the narrow beam optical band to UE1, and, if not, in step 1509 optsat1 transmits the response in the narrow mm band to UE1. In step 1511 UE1 receives the signal and fine tunes the signal. In step 1513 a call is set-up with UE2. Again in step 1515 the system determines if atmospheric conditions are conducive to optical signal link. Then in step 1517 optsat1 transmits in the narrow beam optical band if atmospheric conditions are conducive to an optical signal link, else in step 1519 optsat1 transmits in the narrow mm band. In step 1521 the call is terminated by either UE1 or UE2, and in step 1523 the system resources used for the call are released.

Several approaches are defined at increasing degrees of terminal complexity; they are identified here as: simple satellite/simple user unit, simple satellite/intelligent user unit, intelligent satellite/simple user unit, and intelligent satellite/intelligent user unit. These will be described and a notional comparison of design implications is summarized.

The simple satellite/simple user unit approach is by far the 'simplest' but requires abundant connectivity power/gain and connected numbers of channels relative to numbers of users in any geographic region at a time. In this case it is assumed that there is a transmit/receive laser amplifier pair at each of the satellites' beam positions. It is also assumed that each laser pair has sufficient bandwidth to re-transmit all uplink wavelength channels at once if necessary. For user addressing it is assumed that, of 200 nm of wavelength availability near the 1550 nm band (conservative estimate), 25 THz is always available. For the cellular concept of 1.5 MHz wavelength channels, this provides for about 17 million channels available at any time. Each user unit has a unique transmit/receive wavelength channel pair, although there are several other users with the same individual transmit or receive channels (since there are only 17 million channels and global subscribers could exceed 100 million). The network approach is simply to rebroadcast all user calls through all of the satellites in orbit. It assumes that neither the network nor the user units have knowledge of any user locations. Therefore, if a user calls another user (with unique transmit and receive wavelength channel pairs) all satellites relay the call to all other users in the global network. A small subset of users will have the same assigned receive wavelength channel, and they will ignore it only if the (electronically) decoded message does not contain their unique transmit/receive channel pair for identification purposes. In case several calls are coming in on the caller wavelength channel, resulting in mutual interference, a pool of backup channels is available that the caller can select from in an automatic, pre-determined order, and re-attempt if no response occurs in a few seconds. Once a call has been received by the appropriate recipient, the recipient responds, and again the response is sent by all satellites to all beam positions in the network. In this manner, all users are broadcasting all transmissions to all network points in the constellation. This is the simplest of networks, and also the most wasteful. Further, it cannot support more than the 17 million transmit and receive channels worldwide without some form of multiplexing or eliminating rebroadcasts where the user is not likely to be (e.g., over oceans). Recall that the approach requires a laser pair for each beam position, so essentially network complexity is traded for hardware and power.

Figure 12:
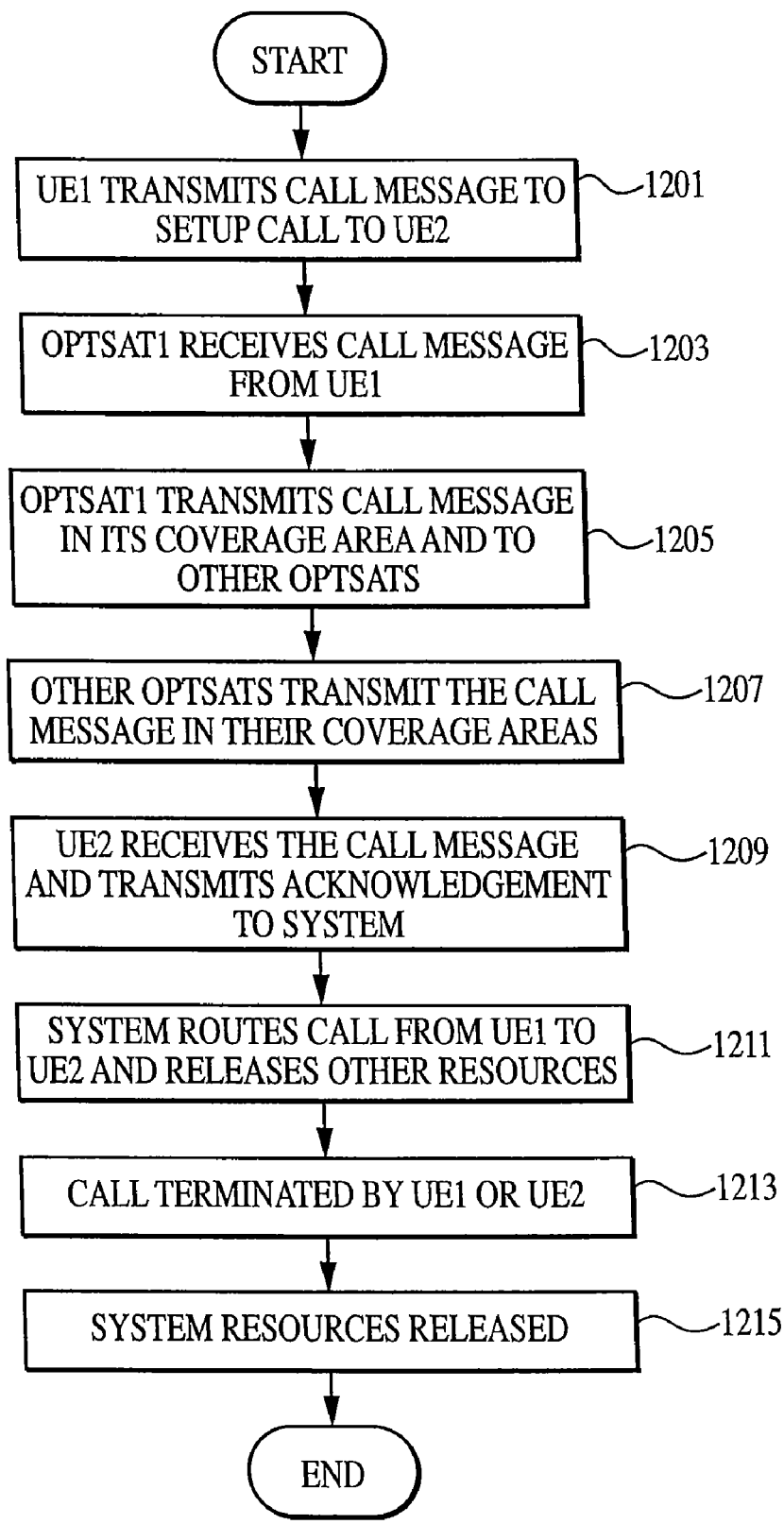
FIG. 12 is a flow diagram depicting a call set-up method for a simple network/simple user equipment system according to an embodiment of the present invention.

FIG. 12 is a flow diagram depicting a call set-up method for a simple network/simple user equipment system according to an embodiment of the present invention. In the following descriptions, "optsat1" and "optsat2" refer to optsats that directly transmit/receive signals to/from a first UE (UE1) and a second UE (UE2), respectively. It can also be said that UE1 is in the coverage area of optsat1, and UE2 is in the coverage area of optsat2. Referring to FIG. 12, in step 1201 UE1 transmits a call message to setup a call to UE2. The call message contains an identification (ID) unique to UE2. In step 1203 optsat1 receives a call message from UE1. In step 1205 optsat1 transmits a call message in its coverage area and to other optsats via crosslinks. In step 1207 the other optsats transmit the call message in their coverage areas. In step 1209 UE2 receives the call message and transmits acknowledgement to system. In step 1211 the system routes the call from UE1 to UE2 and releases other resources. In step 1213 the call is terminated by either UE1 or UE2. Finally, in step 1215 all of the system resources allocated to the call from UE1 to UE2 are released.

In the simple network/intelligent user units every 'zone' in the network is assigned a unique set of transmit and receive wavelength channels and every user registered in that zone will utilize a unique wavelength channel pair. The 'zone' may be as large as the 2000 by 4000 km region of a satellite footprint, or as small as a 17 by 17 km single beam position. Each user unit 'knows' the wavelength pair and registration 'zone' of every other subscriber, and updates are always entered into the units' memories in background communications by the network. Given that any zone could in the worst case be spanned by two satellites as they pass overhead, two satellites will always cover any zone—this also accommodates coverage handoff. The smaller the zone, the more bandwidth is conserved, but the more memory and processing power is required of the user unit. A user will send out a call for another user using the transmit and receive wavelength channels of that user. This will uniquely determine the zone, and the satellites' switching matrix will channel the call to that zone. All beam positions of that zone will add these two call channel signals to the channels in all beams in that zone. When the recipient receives, decodes, and responds to the call, the 'circuit' is already open, and the beams back to the caller are already in place with 'flooding' of all beam positions within the zone. As a mobile user moves out of the zone (or is already out of the registered zone) it will acquire a visitor wavelength pair of the present zone and the satellite network will illuminate the zone with laser transmit/receive pairs assigned to all beam positions within the zone. The present and next-to-pass-over satellites will always be ready to operate in this way. A simple matrix count-up scheme (e.g., based on latitude/longitude) could be applied to automatically route a call to the zone of the wavelength channel pair.

Figure 13:
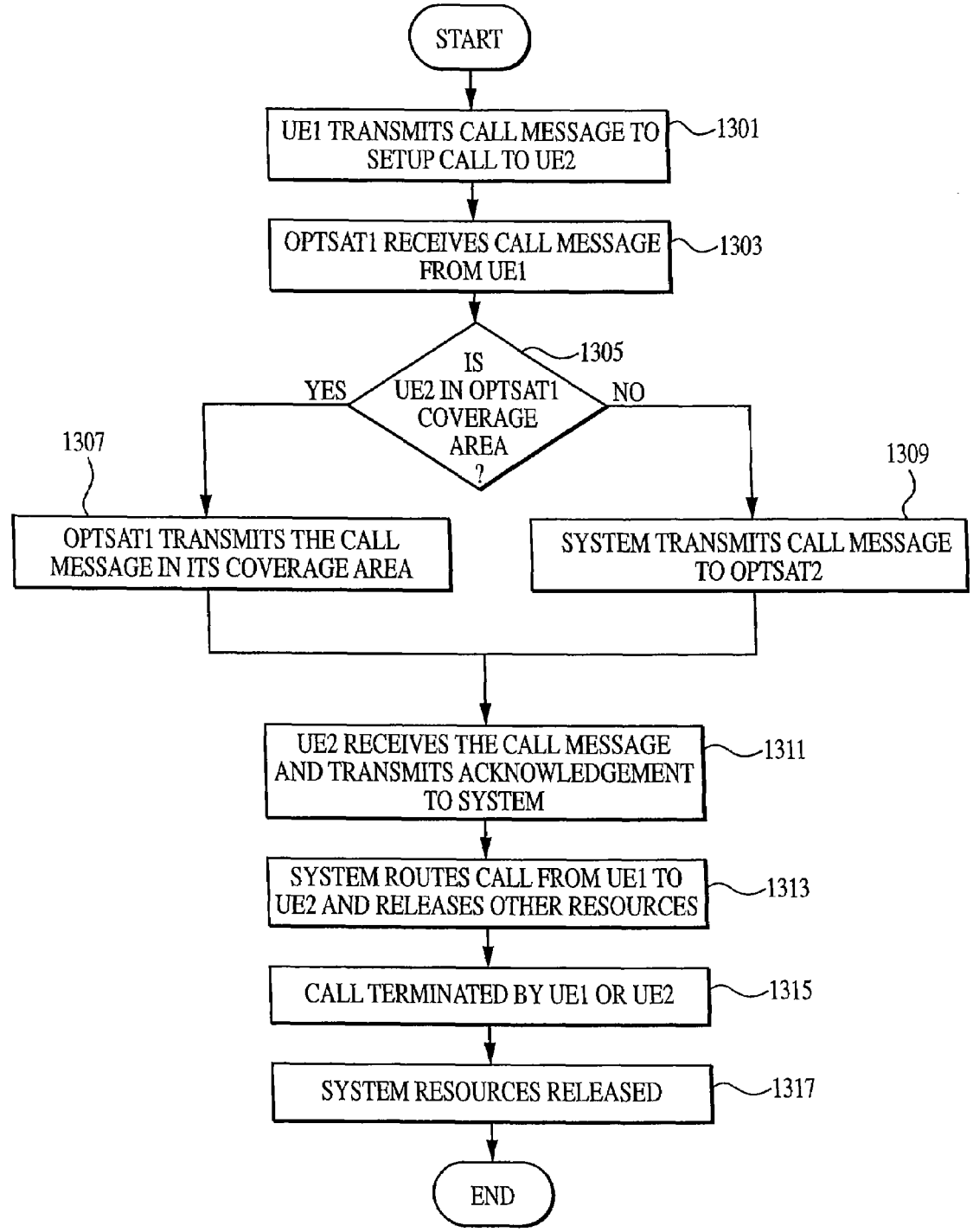
FIG. 13 is a flow diagram depicting a call set-up method for a simple network/intelligent user equipment system according to an embodiment of the present invention.

FIG. 13 is a flow diagram depicting a call set-up method for a simple network/intelligent user equipment system according to an embodiment of the present invention. In step 1301 UE1 transmits call message to setup call to UE2. In step 1303 optsat1 receives call message from UE1. Now, as the system knows where UE2 is located, the system in step 1305 determines if UE2 is in optsat1 coverage area. If it is, the process continues to step 1307 wherein optsat1 transmits the call message to UE2 in its coverage area. If UE2 is not in the coverage area of optsat1, the system in step 1309 transmits call message to optsat2. Either way, in step 1311 UE2 receives the call message and transmits acknowledgement to system. Then in step 1313 the system routes call from UE1 to UE2 and releases other resources. In step 1315 the call is terminated by either UE1 or UE2, and in step 1317 the system resources are released.

As an example of the intelligent network/simple user unit case, assume that a million wavelength channels are time division multiple access (TDMA) 'log-on' channels that are such narrow bandwidths that the satellites do not need substantial laser beam gain and can operate in an omni-directional mode (at least within a 30 by 30 degree sector). Then the satellite has a log-on channel receiver bank that electronically decodes the 'logon data' of a user that has turned on their unit (which automatically logs onto the network) to register the caller ID (and transmit/receive wavelength channel pair) its location (from its transmitted GPS position). This is reported to a command central terminal, located, for example, at a central location. When a user wishes to make the call, it sends a 'ring' via this channel and the central terminal commands the appropriate satellites to immediately open a beam to the ringing channel and to the intended receiver (who also has logged on and whose location is known and tracked). The caller then sends its call through and the satellites maintain track of the callers through GPS updates periodically received from the log-on channels. This approach is the most efficient user of bandwidth but requires central (or hierarchical) routing.

The final case of the intelligent network/intelligent user unit assumes that the control of destination is distributed, residing in the user units and satellites themselves rather than a central controller. In this case all users log-on through the logon wavelength channels and the satellites broadcast to all users with updates to all the user units. Because the bandwidth is low, the reception and broadcast can be from a single defocused beam (or beams) on each satellite covering the entire footprint. The user units are all in sync with who is online and where all users are. If this is sensitive information, then technology exists that could be used to prevent any user from overtly determining the details of any other subscriber by providing circuit anti-tamper protection.

Figure 14:
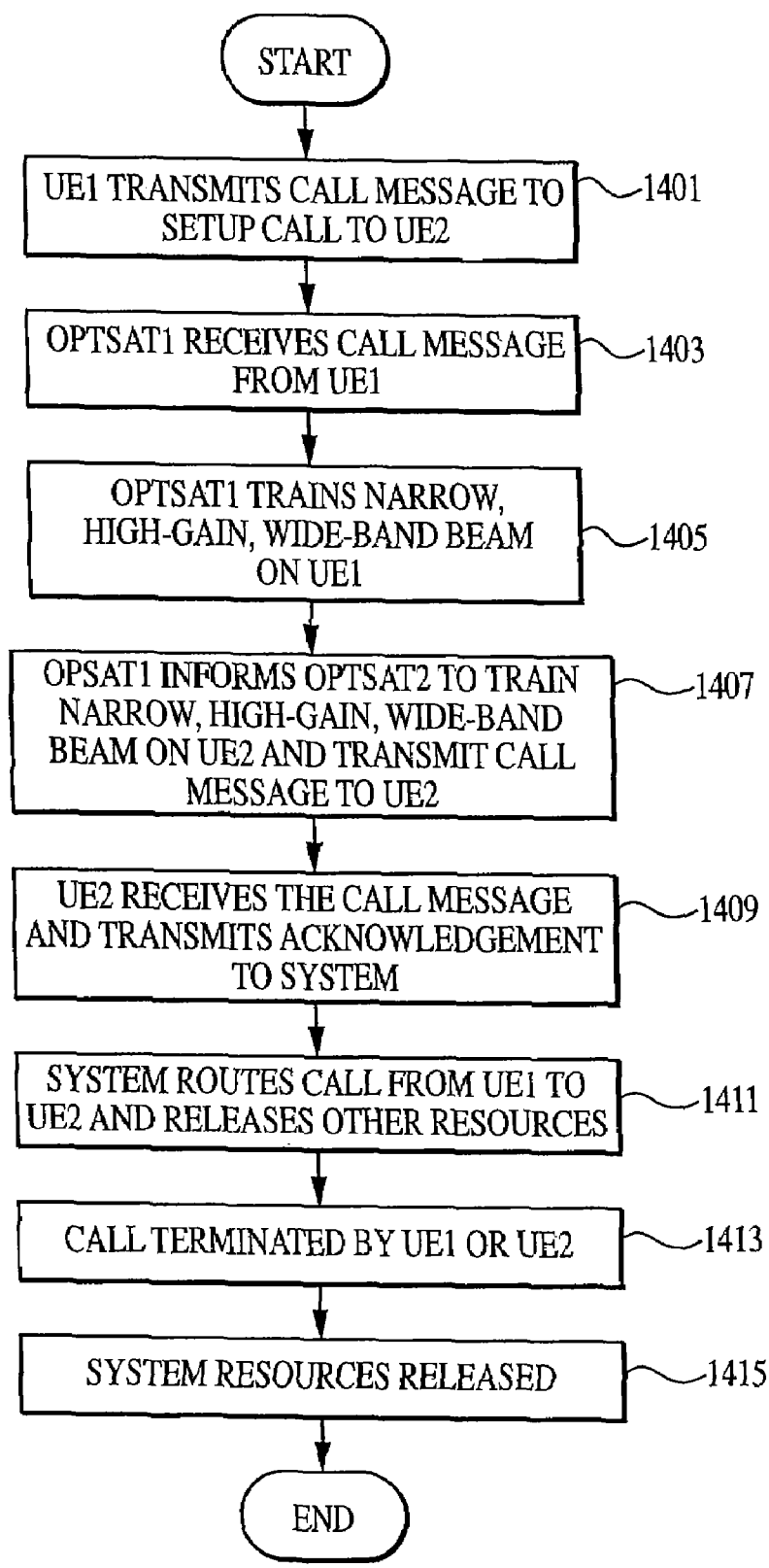
FIG. 14 is a flow diagram depicting a call set-up method for an intelligent network/intelligent user equipment or intelligent network/simple user equipment system according to an embodiment of the present invention.

FIG. 14 is a flow diagram depicting a call set-up method for an intelligent network/intelligent user equipment or intelligent network/simple user equipment system according to an embodiment of the present invention. In step 1401 UE1 transmits call message to setup call to UE2. In step 1403 optsat1 receives a call message from UE1. In step 1405 optsat1 trains a narrow, high-gain, wide-band beam on UE1. Then in step 1407 optsat1 informs optsat2 to train a narrow, high-gain, wide-band beam on UE2 and optsat2 transmits a call message to UE2. In step 1409 UE2 receives the call message and transmits an acknowledgement to system. In step 1411 the system routes the call from UE1 to UE2 and releases other resources. Then in step 1413 the call is terminated by either UE1 or UE2. Finally, in step 1415 all of the system resources allocated to the call from UE1 to UE2 are released.

The above four cases are exemplar, and not meant to be exclusive. Other beam alignment and tracking systems may be substituted.

Figure 5:
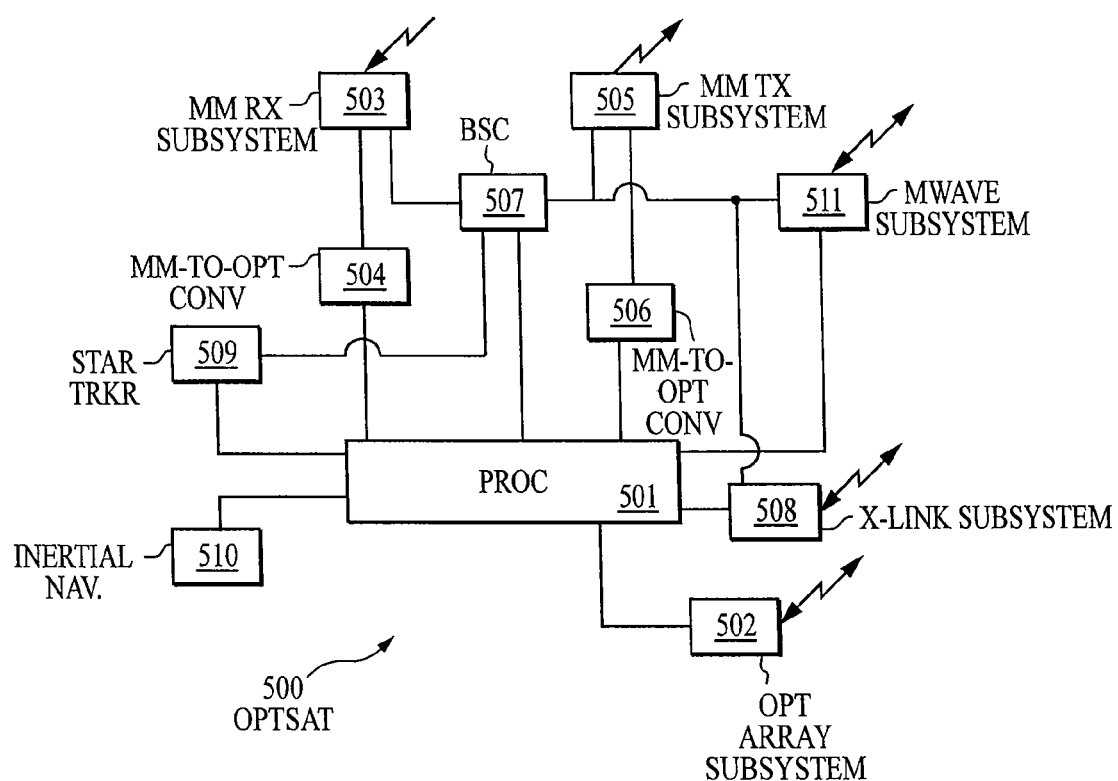
FIG. 5 is a diagram of the internal components of an optsat according to an embodiment of the present invention.

FIG. 5 is a diagram of the internal components of an optsat. Shown in FIG. 5 is processor 501 for controlling the overall operation of the optsat 500. Optical array subsystem 502 is shown connected to processor 501. Optical array subsystem 502 receives and transmits the optical communication signals to and from optsat 500, and performs tracking functions of the optical array (not shown). Also shown are mm receive subsystem 503 and mm transmit subsystem 505, the operation of which was described in detail with respect to FIG. 3 and FIG. 4. Working in conjunction with the mm subsystems are mm-to-optical converter 504, and optical-to-mm converter 506 for converting mm signals to optical signals and optical signals to mm signals, respectively. Microwave subsystem 511 is shown connected to processor 501 and beam steering controller 507. The operation of the microwave subsystem 511 was described in detail with respect to FIG. 3 and FIG. 4. Beam steering controller 507 is shown also connected to mm receive subsystem 503 and mm transmit subsystem 505 for controlling the tracking of the respective subsystems. Beam steering controller 507 is also shown connected to cross-link subsystem 508. Cross-link subsystem 508 is for transmitting and receiving optical signals to and from other optsats in the system. In a system where only one optsat is operational, the cross-link would not be required. Additionally, even though only one cross-link subsystem is shown, more than one cross-link subsystem can be used depending on the total number of other optsats that optsat 500 will be capable of communicating with. The maximum number of cross-link subsystems is limited only by system and physical constraints, such as optsat size and line-of-sight limitations.

An optimal optsat system would utilize clusters of optsats to improve operability. A cluster of optsats is three or more optsats each of which is communicating via cross-links to each other. A cluster system would have two or more clusters of optsats. One optsat from each cluster would be assigned to communicate with another cluster. The cluster configuration would facilitate faster handoff between other optsats in a particular cluster to which it belongs, and would only require an intercluster handoff when a UE is traveling outside the coverage area of the particular cluster.

Two other systems are shown in FIG. 5, namely, a star tracker system 509 and an inertial navigation system 510. These two systems are for positioning and aligning each optsat in its proper orbit, and maintaining that position and orbit. The functions are well known in the art and will not be described herein in detail. The star tracker system 509 is also shown connected to beam steering controller 507. The star tracker system 509 of the optsat 500 works in conjunction with a GPS system of an optsat terminal to coordinate alignment and tracking of a communication link, whether mm, optical or microwave. The optsat 500 receives GPS position information from an optsat terminal and adjusts the alignment of the transmit or receive subsystem to maintain the proper communication link. The alignment procedures will be discussed below in more detail.

Multiple-Beam Optical Scanning Array

As discussed earlier, a main component of the satellite based mobile communication system according to the present invention is the multiple beam optical scanning array ("optical array"). Each optsat is configured with at least one optical array. Two present alternatives are available to implement the optical array, a MEMS (Micro-electronic Mechanical Mirrors) device or an optical switches device, each of which will be described in detail herein below.

Figure 6A:
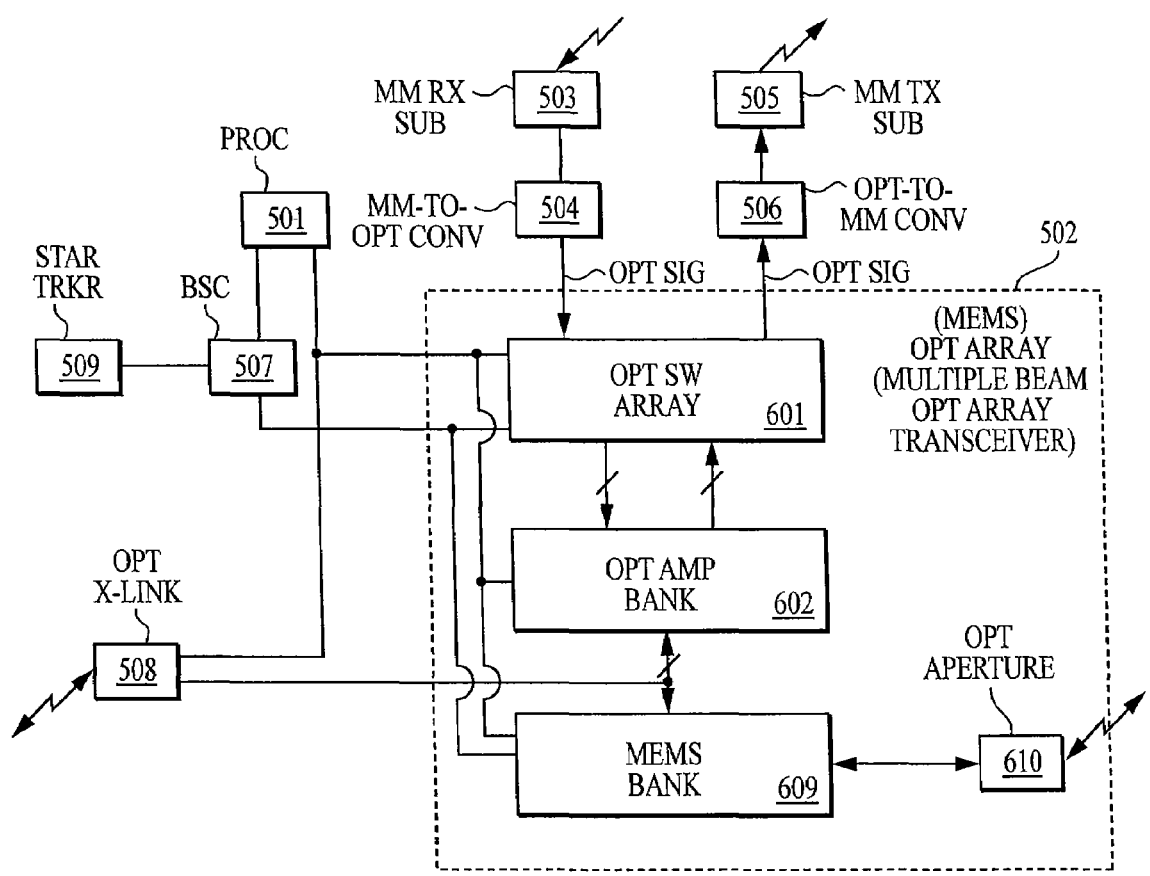
FIG. 6A is a diagram of a multiple beam optical scanning array utilizing a MEMS device according to an embodiment of the present invention.

FIG. 6A is a diagram of the multiple beam optical scanning array utilizing the MEMS device. The optical array 502, containing the MEMS multiple beam optical scanning array (MEMS array) will now be described. An optical switch array 601 for routing the optical signals to either the mm systems (503, 504, 505 and 506), a laser amplifier bank 602, or cross-link 508 is shown. Optical switch array 601 is under the control of processor 501 and receives beam steering commands from beam steering controller 507. Laser amplifier bank 602 receives signals from the optical switch array 601, amplifies the signals, and transmits the amplified signals to the MEMS bank 609, or to cross-link 508 for transmission to another optsat. Optical aperture 610 receives the signals from the MEMS bank 609. Laser amplifier bank 602 also receives control signals from processor 501 for turning on individual amplifiers that are required for a communication link, and turning off amplifiers that are not processing signals to conserve power, resources and reduce cross interference.

Figure 6B:
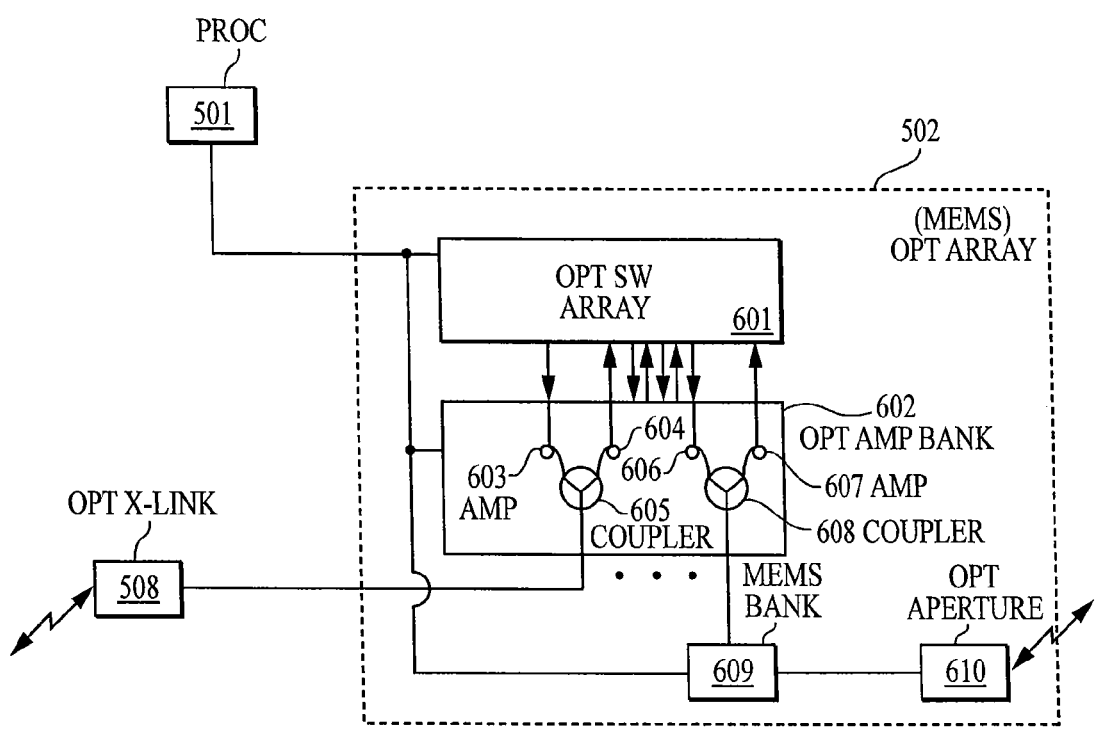
FIG. 6B is a diagram detailing the laser amplifier bank of FIG. 6A.

FIG. 6B is a diagram detailing the laser amplifier bank of FIG. 6A. Shown in FIG. 6B is optical switch array 601 with multiple pairs of optical receive and transmit lines connected to laser amplifier bank 602. A first pair of optical transmit and receive lines are shown connected to a first transmission amplifier 603 and a first high gain reception amplifier 604, each for amplifying their respective signals. A second pair of optical transmit and receive lines are shown connected to a first transmission amplifier 606 and a first high gain reception amplifier 607, each for amplifying their respective signals. Amplifiers 603, 604, 606 and 607 can be EDFAs (erbium-doped fiber amplifier), but the system is not restricted by the type of amplifiers used. A first bi-directional coupler 605 is shown coupling the first amplified transmit and receive lines. The coupled signals are output from the laser amplifier bank 602 to cross-link 508 for transmission to another optsat. A second bi-directional coupler 608 is shown coupling the second amplified transmit and receive lines. The coupled signals are output from the laser amplifier bank 602 to MEMS bank 609 for transmission to a user through optical aperture 610, which is preferably a holographic aperture.

As shown in FIG. 6A and FIG. 6B, each coupled optical signal emanating from laser amplifier bank 602 has a separate mirror (not shown), located in the MEMS bank 609, associated therewith. The beam steering controller 507 through the use of micro-mechanical devices separately controls each mirror. The speed at which the optical beams can be pointed, scanned and switched is of paramount importance. The use of micro-mechanical devices, though fast, has inherent drawbacks in the time it takes to translate movement from an electrical command to the end of the mechanical adjustment. As a result, an alternative to implement the optical array, namely, an optical switches device, is now disclosed.

Figure 7A:
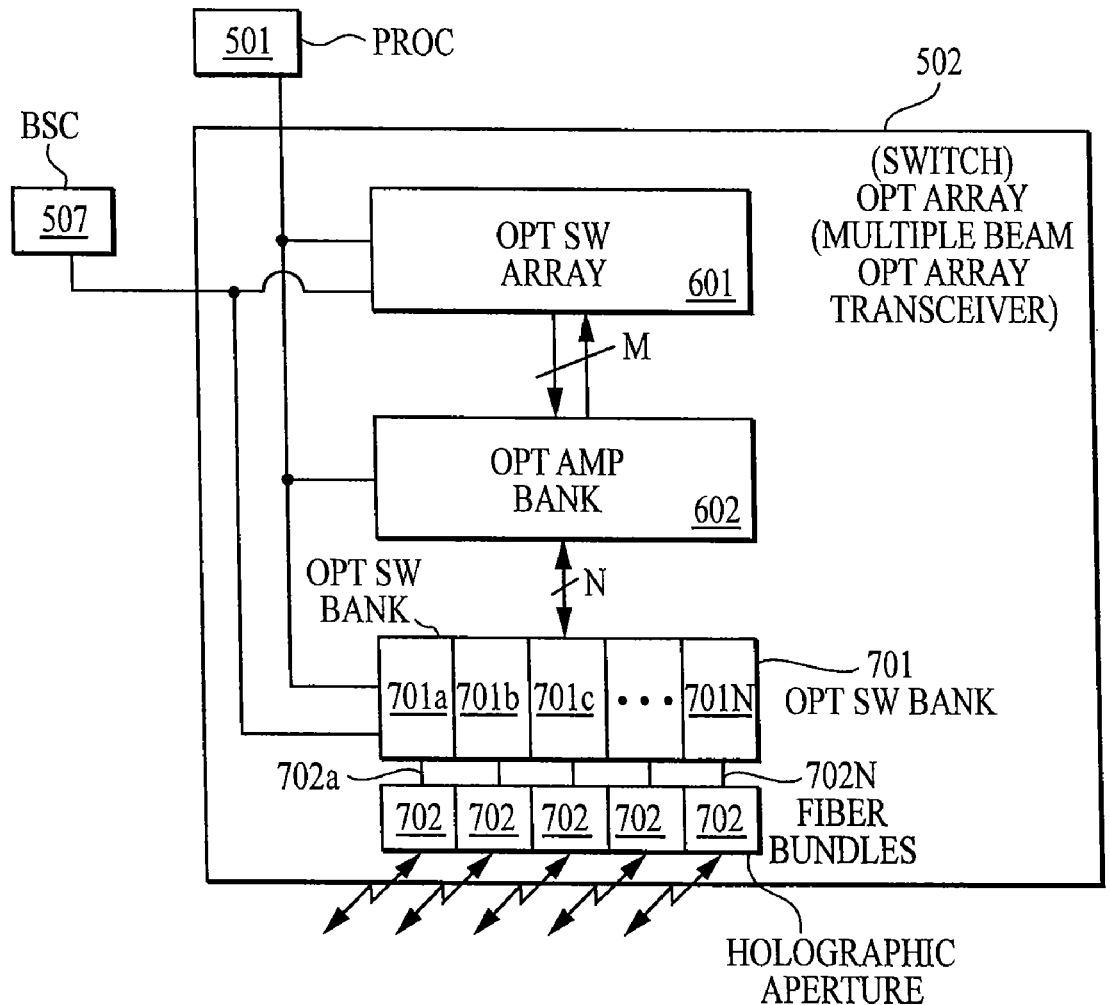
FIG. 7A is a diagram of the multiple beam optical scanning array utilizing a optical switch device according to an embodiment of the present invention.

FIG. 7A is a diagram of the optical array utilizing the optical switches device. As FIG. 7A illustrates, the optical array subsystem 502 differs from the MEMS configuration in that the optical switch approach replaces the MEMS bank 609 with one or more layers of 1×N optical switch bank unit 701. As illustrated in FIG. 7A, M pairs of transmit and receive optical lines are fed into optical amplifier 602 where they are coupled in the bi-directional couplers, as shown in FIG. 6B. Optical amplifier 602 outputs N bi-directional optical lines. The N bi-directional optical lines are fed into the optical switch bank unit 701, which is comprised of N optical switch banks 701a-701N, one switch bank for each bi-directional optical line. The optical switch bank unit 701 outputs N fiber bundles 702a-702N. Each fiber bundle 702a-702N is directly connected to a holographic aperture 702. The number of holographic apertures 702 is equal to N. The holographic apertures 702 transmit and receive the terrestrial optical signals from the optsat terminals.

Figure 7B:
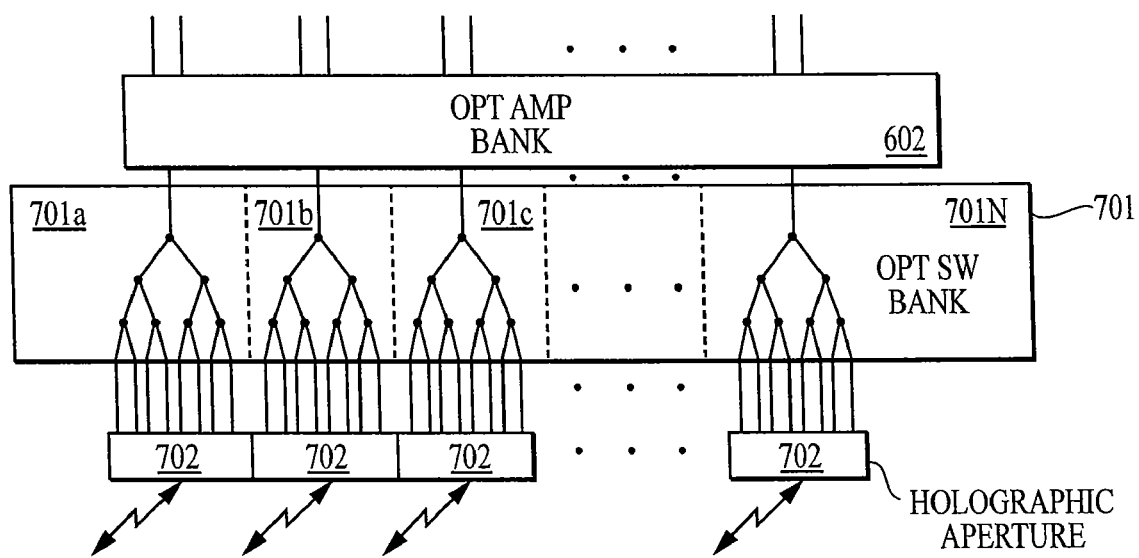
FIG. 7B is a detailed view of the optical switch bank unit depicted in FIG. 7A.

FIG. 7B is a detailed view of the optical switch bank unit 701 depicted in FIG. 7A. As illustrated in FIG. 7B, each optical switch bank 701a-701N is a series of binary switches. The binary switches are under the control of the beam steering controller 507. As the UE in communication with the optsat moves and changes position, the optsat's tracking system continually monitors the strength and position of the UE. As the UE moves, the beam steering controller 507, switches from one pair of transmit and receive switches to another to monitor the communication link.

Figure 7C:
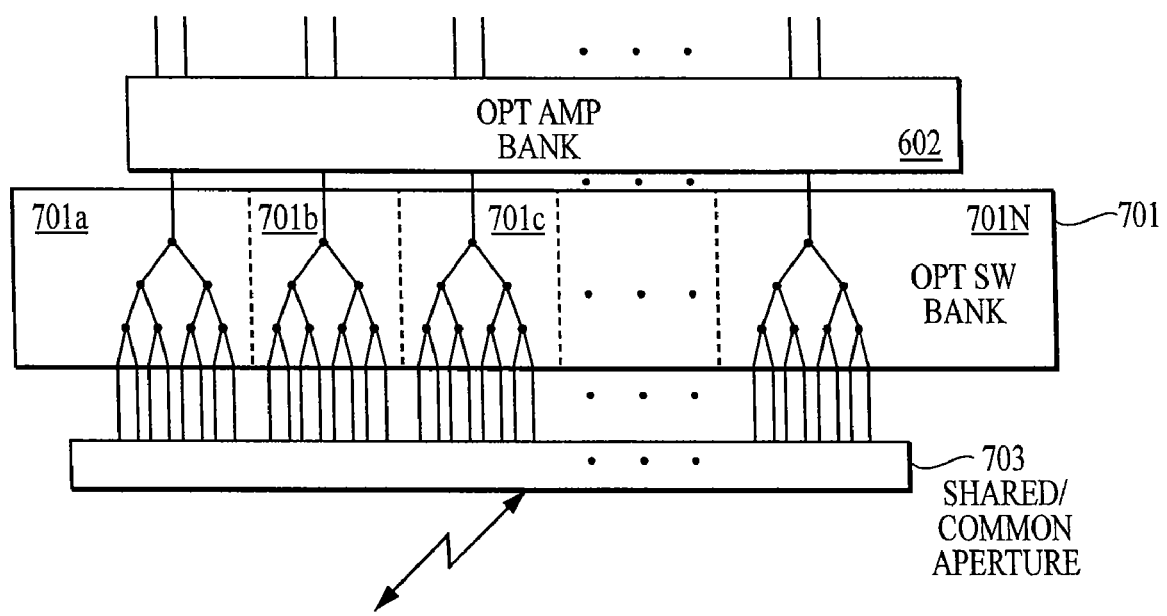
FIG. 7C is a detailed illustration of a second embodiment of optical apertures shown in FIG. 7A and FIG. 7B.

FIG. 7C is a detailed illustration of a second embodiment of the optical apertures shown in FIG. 7A and FIG. 7B. As shown in FIG. 7C, the N optical apertures 702 are replaced by a single shared optical aperture 703. All of the outputs of the optical switch banks 701a-701N are input into the single shared optical aperture 703. The single optical aperture 703 transmits and receives the optical signals from the optsat terminals.

An example of the operation of the optical array subsystem will now be described with reference to FIGS. 7A, 7B and 7C. Consider a 30×30 degree field of view (FOV). Approximately 1000 beams with a beam width of 1 degree would be required to cover the FOV. If 32 beams are require to be active at any time, 32 pairs (M) of transmit and receive lasers would be needed, each pair supporting one beam. A single layer 1×N matrix is required where N=32. If the beam width is to be 0.07 degrees, and 256 beams are to be active at any one time, two 1×N optical switch layers would be required, for a total of nearly 200,000 beam positions.

2. Multiple-Beam Millimeter Wavelength Array

As discussed earlier, there is a need for a backup system in times when atmospheric conditions prohibit the transmission of optical signals. To fill this need a mm wavelength multiple beam adjunct system has been developed. The mm system is subordinate to the optical system. For commercial applications the 95-105 GHz band is utilized, but other bands are applicable to the system. As shown in the previous figures, a transmit mm array and a receive mm array are required. Each of the arrays will first be described, followed by a description on the implementation into the optsat and the optsat terminal.

Figure 8:
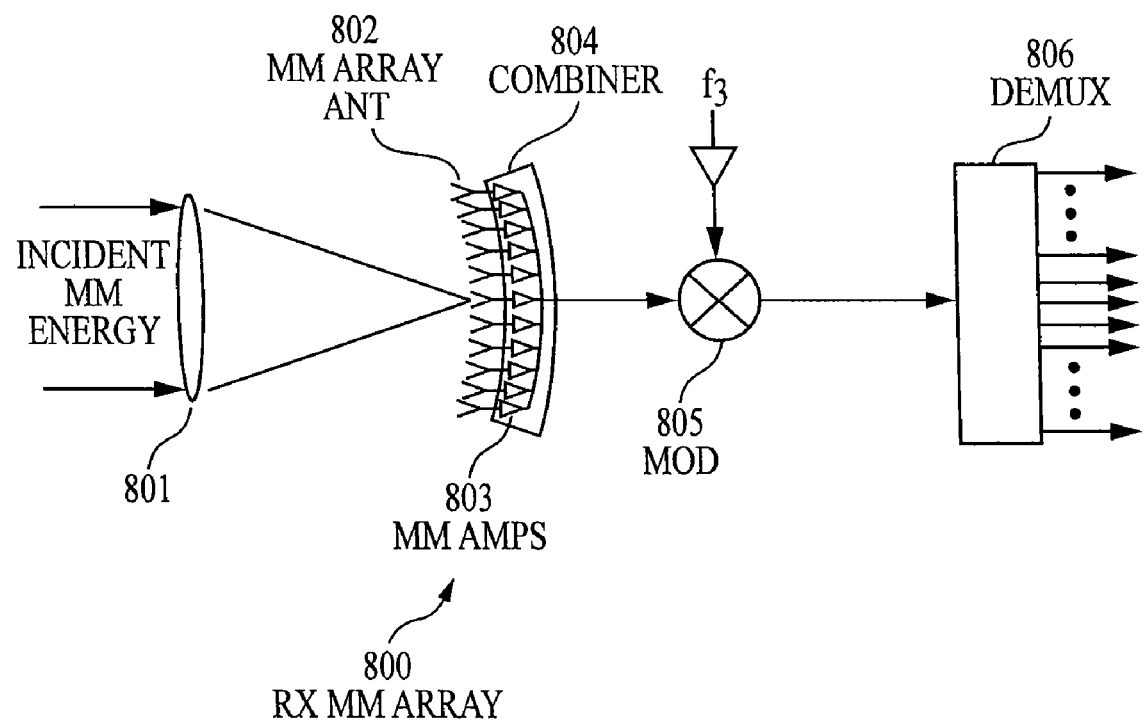
FIG. 8 illustrates a receive millimeter (mm) array antenna according to an embodiment of the present invention.

FIG. 8 illustrates a receive mm array according to an embodiment of the present invention. Shown in FIG. 8 are mm lens 801 for focusing the incident mm signals, mm array antenna 802 for detecting the focused mm signals, low noise high gain amplifiers 803 for amplifying the detected signals, an N-to-1 combiner 804 for combining the N signals, a modulator 805 for modulating the combined signals with modulation frequency f3, and an optical 1-to-N splitter 806 for demultiplexing the modulated signals into individual channels.

A description of the operation of the mm receive array 800 will now be made with respect to FIG. 8. The mm lens 801 receives the energy associated with a mm signal and focuses the signal onto one of a plurality of elements comprising the array antenna. The array antenna 802 is a two-dimensional array and concave in shape and conforms to the array focal contour of the mm lens 801, to assure focus at all points within the field of view. The elements of the array antenna 802 can be manufactured using a patch or fine-line method etched into a substrate. The spacing of the elements of the array antenna 802 is defined by the system requirements, for example, number of beams or sector of operation. Each element of the array antenna 802 is connected to one of the low-noise, high gain amplifiers 803. The connections between the elements of the array antenna 802 and the amplifiers 803 can be via parallel planar waveguides etched onto strips containing a number of guides in parallel. The amplifiers 803 can be, for example, Gallium Arsenide (GaAs) amplifiers. The amplifiers 803 are formed into a two dimensional array that conforms to the shape of the array elements 802 to minimize the distance between the array elements 802 and the amplifiers 803, thus reducing the noise. The amplifiers 803 feed the amplified signals to the N-to-1 combiner 804 to combine the signals from the entire array of amplifiers 803. This results in a single mm channel with all of the receive channels superimposed and wavelength division multiplexed. Also, noise can be minimized even further by controlling the on and off of the receive amplifiers 803. The combined signals are fed into modulator 805 where they are modulated with optical modulation signal f3. Nominally, a 1550 nm wavelength modulation frequency is applied, but other modulation frequencies can be used depending on the system. The modulated signals are then split into separate fiber optic lines in splitter 806 for distribution into the various systems of the optsat or optsat terminal. If a single mm beam and a single wavelength channel are used, the combiner 804 merely directs the signal into the modulator, and the splitter 806 could be bypassed.

In the previous embodiment of the present invention, the mm channels perform optimally when using very steep elevation angles. In practice, maintaining a narrow or steep field of view relative to the zenith allows the system to operate in the mm band in more adverse atmospheric conditions than when the system is operated at wide angles. The travel distance of the millimeter wavelength energy is reduced, thus minimizing transmission or path loss associated with transmission through the atmosphere. An angle found as a good balance between path loss and costs associated with requiring more signals to provide full coverage is 30 degrees from zenith.

Figure 9:
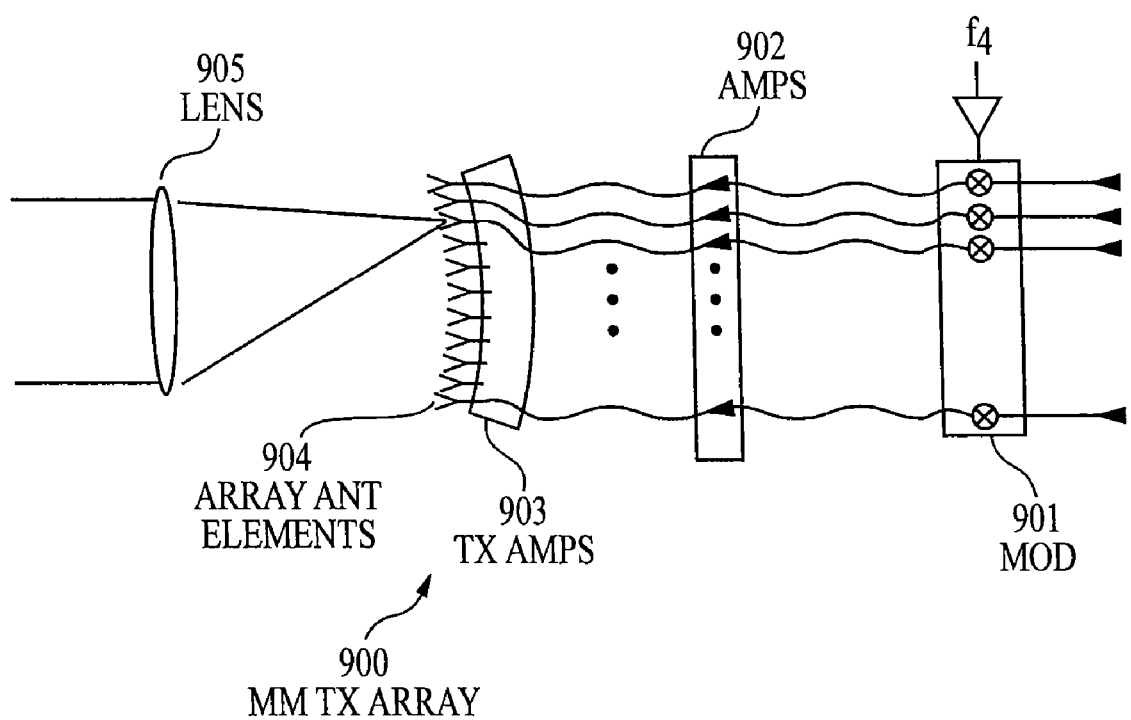
FIG. 9 is a diagram of a transmit mm array antenna according to an embodiment of the present invention.

FIG. 9 is a diagram of the mm transmit array according to an embodiment of the present invention. Shown in FIG. 9 are a plurality of modulators 901 for modulating optical transmission signals with carrier frequency f4, the optical transmission signals being received from the internal components of the optsat or optsat terminal, driver amplifiers 902 for amplifying the modulated signals, high power transmit amplifiers 903 for further amplifying the amplified signals, array antenna elements 904 for transmitting the mm signals to lens 905 for focusing and final transmission to optsats or optsat terminals, depending on the location of the mm transmit antenna 900. Note that if only a single beam and single channel is being transmitted, for example from an optsat terminal, a single modulator could be used and the modulated signal would be multiplexed onto the driver amplifiers 902.

A description of the operation of the mm transmit antenna 900 will now be made with respect to FIG. 9. Multiple optical channels feed optical signals to the plurality of modulators 901 where the signals are modulated with carrier frequency f4. As an example, the carrier frequency for 1550 nm wavelengths would be a 100 GHz carrier frequency. The modulated signals are fed into the driver amplifiers 902 for a first stage amplification. The number of driver amplifiers is equal to the number of channels. The amplified signals are then forwarded to high power amplifiers 903 for a second and high power amplification. The high power amplifiers are connected to the array antenna elements 904 which receive the high power amplified signals and direct the signals to the lens 905. The lens transmits the mm signals to the optsat or optsat terminal.

Figure 10:
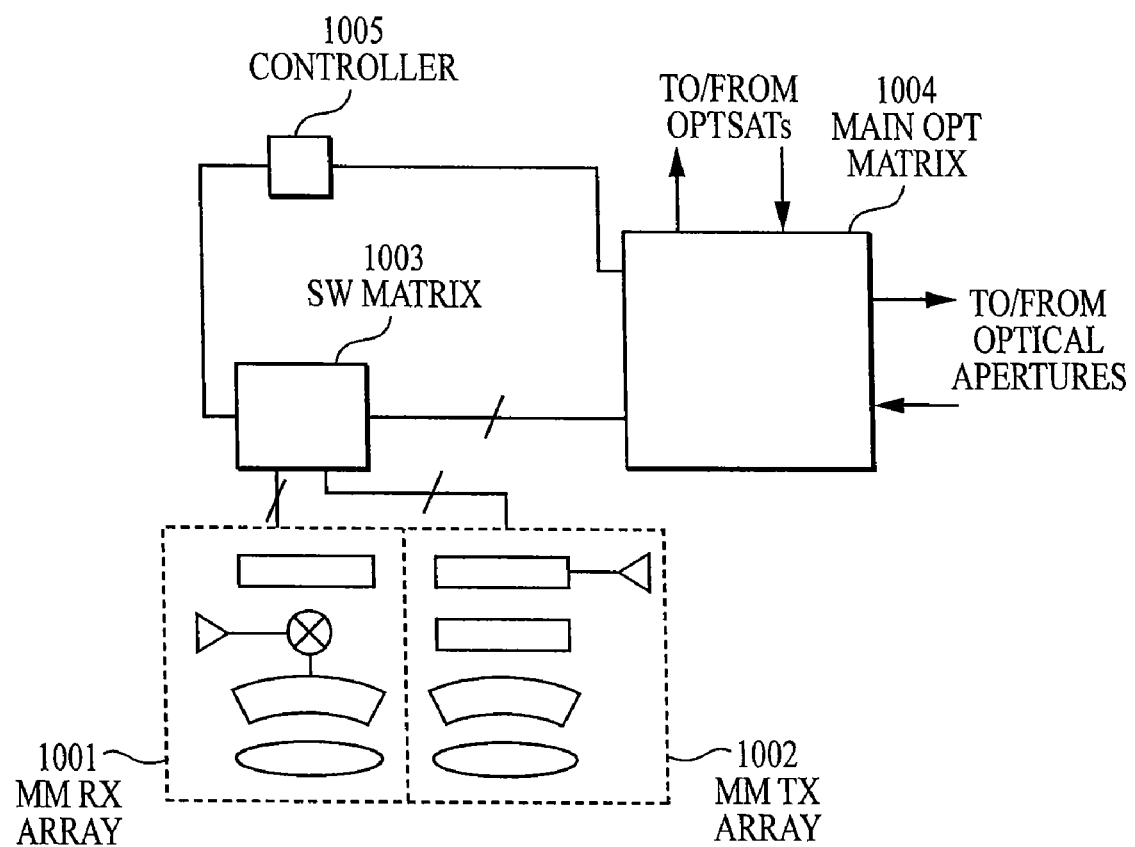
FIG. 10 illustrates the configuration of the transmit and receive mm arrays in an optsat according to an embodiment of the present invention.

FIG. 10 illustrates the configuration of the transmit and receive mm arrays in an optsat. FIG. 10 shows mm receive array 1001 and transmit array 1002 optically connected to a switch matrix 1003. Switch matrix 1003 is connected to main optical matrix 1004, which feeds signals throughout the optsat. The components shown in FIG. 10 are under the control of controller 1005.

The operation of the optsat will now be described with respect to FIG. 10. When a signal is received at mm receive array 1001 the signal is optically modulated and forwarded to switch matrix 1003. Controller 1005 decides whether the received signal will be switched to the mm transmit array 1002, or to another optsat (not shown) or to the optical apertures (not shown). Also, under the control of the controller 1005, signals received at any of the receiver optical apertures, cross-link subsystems, or mm arrays can be switched to any of the transmitter optical apertures, cross-link subsystem, or mm arrays, the switching of which would depend on the atmospheric and system conditions discussed earlier herein.

Figure 11:
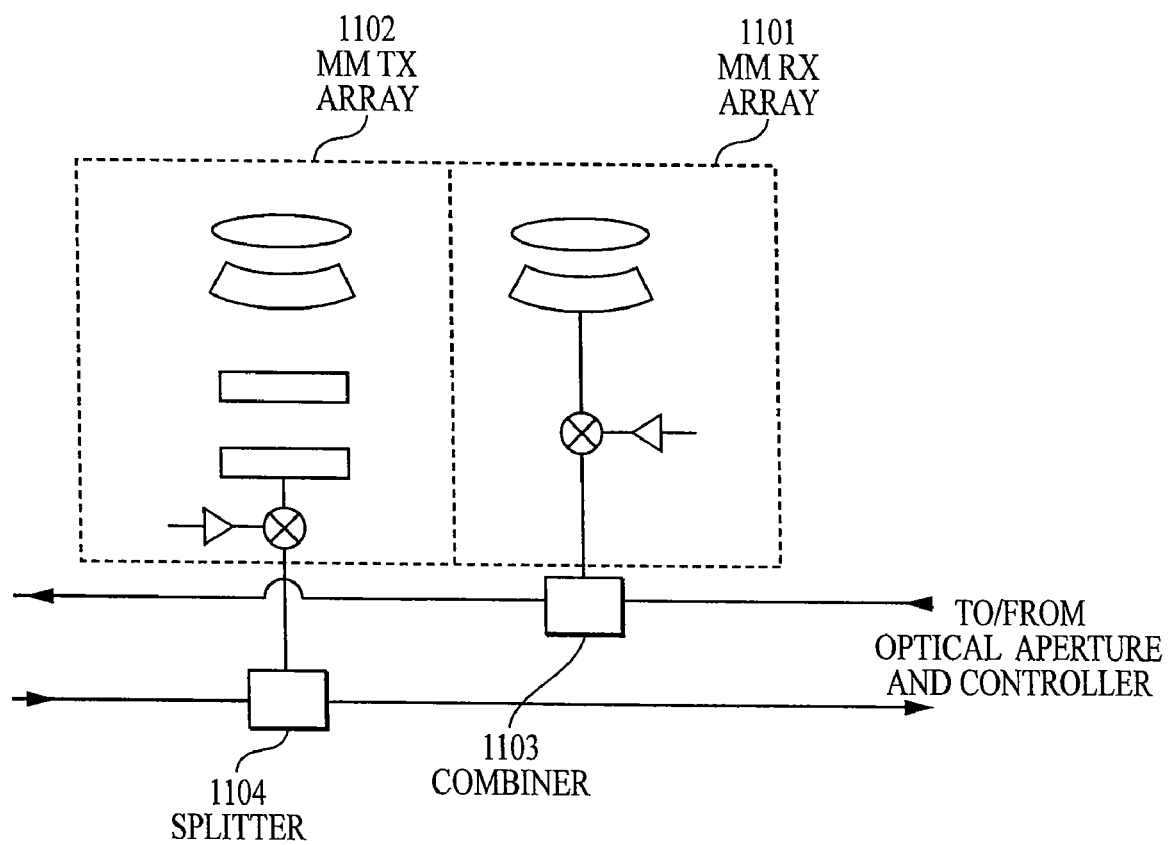
FIG. 11 illustrates the configuration of the transmit and receive mm arrays in an optsat terminal according to an embodiment of the present invention.

FIG. 11 illustrates the configuration of the transmit and receive mm arrays in an optsat terminal. FIG. 11 shows mm receive array 1101 and transmit array 1102 optically connected to combiner 1103 and splitter 1104, respectively.

Combiner 1103 and splitter 1104 are optically connected to the signal processing circuitry of the optsat terminal. Depending on the sensed weather conditions or a manual override, the mm receive array 1101 and mm transmit array 1102 would be powered up or down. As an alternative, combiner 1103 and splitter 1104 could be replaced with switches that route the optical signals to the mm arrays or the optical arrays as determined by the optsat terminal controller. The components shown in FIG. 11 are under the control of the optsat terminal controller (not shown).

As described earlier, optical communications can be severely limited by cloud cover or other atmospheric conditions. In prior art applications, if cloud cover were an issue, a cloud-free line of sight solution was adopted. This, of course, did not address the issue, but instead avoided it entirely. As an optical pulse travels from a satellite to a ground location, cloud cover slows and disperses the pulse to a point where the optical link degrades eventually below a useful level. By determining and calculating losses in received pulse energy, cloud characteristics can be determined, either by calculations or look-up tables. Also, wavelength changes can be measured in the received pulse energy to determine cloud effects. In the following discussion, determining cloud cover type is required for incremental adjustments to the system. Various known methods for determining cloud cover type can be used, including radar and satellite imaging, as well as receiving from a weather service the cloud cover type. Also, a more simplistic system can be realized if a worst case cloud cover is assumed in any case where cloud cover exists.

To determine the effects of cloud cover on optical pulses, optical thickness ($\tau$) must first be determined. The more optically thick a cloud cover, the more diffusion and pulse stretching will occur. Pulse stretching refers to a phenomenon wherein the optical pulse is slowed as it travels through cloud cover, thus "stretching" the wavelength. The achievable bandwidth (BW) can be determined based on $\tau$ as follows:

$$BW(\tau) = 10^{a3 + a2 \log \tau + a1 (\log \tau)^2}$$

Where a1, a2 and a3 are parameters that correspond to various cloud types. Table 1 details the cloud type parameters, based on clouds containing molecules of ice or water.

TABLE 1

| Cloud | constituent | a1 | a2 | a3 | $BW(\tau)|_{\tau=1}$ (MHz) |
|---|---|---|---|---|---|
| low-level | water | 0.4017 | −2.547 | 8.030 | 107 |
|  | ice | 0.2318 | −1.559 | 7.426 | 26.7 |
| mid-level | water | 0.3917 | −2.525 | 7.997 | 99.3 |
|  | ice | 0.2243 | −1.538 | 7.387 | 24.4 |
| high-level | water | N/A | N/A | N/A | N/A |
|  | ice | 0.2177 | −1.637 | 7.005 | 10.1 |

For example, if a clear sky optical beam is pulsed at a nanosecond level (i.e. 1000 MHz), one channel is required to achieve a giga bit per second (bps) data rate. Now, if the achievable bandwidth is only in the microsecond range, by increasing the number of channels to 1,000, the same Giga bps data rate can be achieved. By taking into consideration the change in the achievable bandwidth and increasing the number of channels, the data rate can be maintained. Even in the most taxing situation (high-level, ice clouds), a bandwidth of at least 10 MHz can be achieved.

To determine the optical thickness, the received energy can be utilized as a function of $\tau$ as follows:

$$E(\tau) = E_{ro} e^{-\tau/\tau_0}$$

where $E_{ro}$ is the measured received energy, and $\tau_0$ is the known optical thickness of a particular type of cloud. The types of clouds are based on cloud temperature. Cloud temperature below freezing yields $\tau_0 \sim 5$, and cloud temperature above freezing yields $\tau_0 \sim 13.3$. Thus $\tau$ and then the achievable bandwidth BW can be determined.

As detailed above, the present invention provides a satellite based communications system that can provide economical communications capabilities to millions of users. The proposed system eliminates the need of unsightly cellular telephone towers and the multitude of wired connections. The proposed system also provides for access of communications to remote and desolate regions of the planet without the expense of running wires to those locations.

An approach that could allow each wavelength to be used in an optimal manner involves the use of commercial aircraft as relay terminals between optical satellites and UEs on the earth surface. An aircraft flying near the transition from space and the upper atmosphere into the troposphere, can convert to/from mm band for earth-aircraft paths to optical wavelengths for the aircraft-satellite path. The system would leverage the large percentage of aircraft in flight at any moment to provide an intermediate relay function from mm band earth-bound terminals to optical satellite band optsats. By allocating the mm band personal channels to the aircraft-to-ground leg allows for the more weather-tolerant mm band use, minimizes power requirement (much shorter propagation paths) and provides for inter-aircraft and satellite-aircraft routing diversity against severe weather outages. It is assumed that the participating commercial aircraft operate along their regular routes; the relay function operates automatically and transparent to in flight operations. Also, even prior to a global satellite optsat network, the aircraft relay concept could serve as a replacement for cellular towers and provide substantial increase in user bandwidth. More reliance would necessarily be placed on inter-aircraft relay (without satellites), and some towers may still be needed for coverage gaps.

Figure 16:
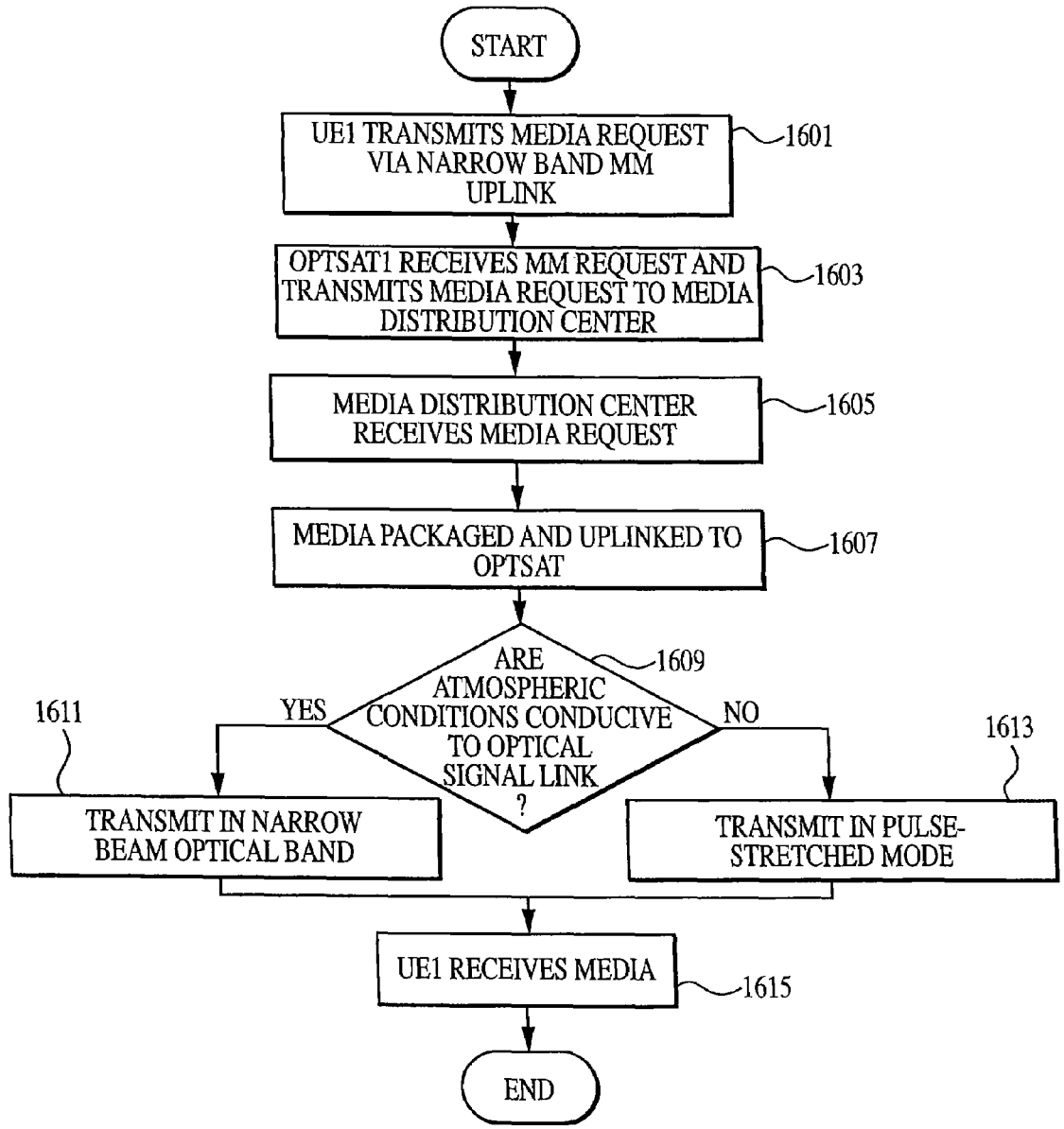
FIG. 16 is a flow diagram depicting media distribution according to an embodiment of the present invention.

Distribution of media from media distribution centers to UEs is contemplated by the present invention. A media distribution center would store various media works including music, movies, etc. Upon demand, a user can request a copy of a particular media work and the media distribution center would package the media work and transmit it to the UE. FIG. 16 is a flow diagram depicting media distribution according to an embodiment of the present invention. Referring to FIG. 16, in step 1601 UE1 transmits a media request via narrow band mm uplink to optsat1. In step 1603 optsat1 receives the mm request and transmits a media request to a media distribution center. Then in step 1605 media distribution center receives the media request. In step 1607 the media is packaged and uplinked to optsat1. In step 1609 it is determined if atmospheric conditions are conducive to an optical signal link. If so, in step 1611 optsat1 transmits in the narrow beam optical band, and if not, in step 1613 optsat1 transmits in the pulse-stretched mode. Then in step 1615 the UE1 receives the requested media.

It is noted that one skilled in the art understands that high-speed data transfer from satellites to the earth's surface is subject to high levels of data corruption. One approach to correcting this corruption is to incorporate an optical phase-front reconstruction procedure into the system. This reconstruction process is currently utilized in the field of astronomy to reconstruct signals received from space. Other reconstruction processes are contemplated as being applicable to the system as the actual reconstruction process used is not critical to the operation of the present invention.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A communications system for wireless transceiving of information, comprising:
   at least one multiple beam scanning array transceiver contained in a satellite for wirelessly transceiving the information, wherein the multiple beam scanning array transceiver is a multiple beam optical array transceiver that transceives free-space optical signals;
   at least two terminals at diverse locations capable of wirelessly transceiving said information between the terminals and the satellite;
   an apparatus for providing optical communications via an optical signal during adverse atmospheric conditions, comprising:
   a determiner for determining a change in the maximum achievable bandwidth based on the atmospheric conditions; and
   a controller for adjusting the pulse rate of the optical signal to compensate for the change in the maximum achievable bandwidth; and
   means for determining a particular type of atmospheric condition present,
   wherein the maximum achievable bandwidth is determined by the following equation:

$$BW(\tau)=10^{a3+a2\,\log\tau+a1(\log\tau)^2}$$

where BW is the maximum achievable bandwidth, $\tau$ is an optical density of the atmospheric conditions, and a1, a2 and a3 are parameters that correspond to various cloud types, and
   wherein the optical density is calculated by the following equation:

$$E(\tau)=E_{ro}e^{-\tau/\tau o}$$

where $E_{ro}$ is a measured received energy, and $\tau o$ is a known optical thickness of the particular type of atmospheric condition.

2. The apparatus of claim 1, wherein the known optical thickness of a cloud containing water molecules is 5.

3. The apparatus of claim 1, wherein the known optical thickness of a cloud containing ice molecules is 13.3.

4. A method of providing communications via an optical signal during adverse atmospheric conditions, comprising the steps of:
   determining a change in the maximum achievable bandwidth based on the atmospheric conditions;
   adjusting a pulse rate of the optical signal to compensate for the change in the maximum achievable bandwidth; and
   determining a particular type of atmospheric condition present,
   wherein the maximum achievable bandwidth is determined by the following equation:

$$BW(\tau)=10^{a3+a2\,\log\tau+a1(\log\tau)^2}$$

where BW is the maximum achievable bandwidth, -c is an optical density of the atmospheric conditions, and a1, a2 and a3 are parameters that correspond to various cloud types, and
   wherein the optical density is calculated by the following equation:

$$E(\tau)=E_{ro}e^{-\tau/\tau o}$$

where $E_{ro}$ is a measured received energy, and to is a known optical thickness of the particular type of atmospheric condition.

5. The apparatus of claim 4, wherein the known optical thickness of a cloud containing water molecules is 5.

6. The apparatus of claim 4, wherein the known optical thickness of a cloud containing ice molecules is 13.3.

7. An apparatus for providing optical communications via an optical signal during adverse atmospheric conditions, comprising:
   a determiner for determining a change in the maximum achievable bandwidth based on the atmospheric conditions;
   a controller for adjusting a pulse rate of the optical signal to compensate for the change in the maximum achievable bandwidth; and
   means for determining a particular type of atmospheric condition present,
   wherein the maximum achievable bandwidth is determined by the following equation:

$$BW(\tau)=10^{a3+a2\,\log\tau+a1(\log\tau)^2}$$

where BW is the maximum achievable bandwidth, $\tau$ is an optical density of the atmospheric conditions, and a1, a2 and a3 are parameters that correspond to various cloud types, and
   wherein the optical density is calculated by the following equation:

$$E(\tau)=E_{ro}e^{-\tau/\tau o}$$

where $E_{ro}$ is a measured received energy, and to is a known optical thickness of the particular type of atmospheric condition.

8. The apparatus of claim 7, wherein the known optical thickness of a cloud containing water molecules is 5.

9. The apparatus of claim 7, wherein the known optical thickness of a cloud containing ice molecules is 13.

* * * * *